(12) United States Patent
Wei et al.

(10) Patent No.: US 7,596,791 B2
(45) Date of Patent: Sep. 29, 2009

(54) METHODS AND TECHNIQUES FOR DELIVERING RICH JAVA APPLICATIONS OVER THIN-WIRE CONNECTIONS WITH HIGH PERFORMANCE AND SCALABILITY

(75) Inventors: Coach K. Wei, Boston, MA (US); Zakir Magdum, Shrewsburry, MA (US)

(73) Assignee: EMC Corporation, Hopkinton, MA (US)

( * ) Notice: Subject to any disclaimer, the term of this patent is extended or adjusted under 35 U.S.C. 154(b) by 911 days.

(21) Appl. No.: 10/017,183

(22) Filed: Dec. 7, 2001

(65) Prior Publication Data

US 2003/0200254 A1    Oct. 23, 2003

Related U.S. Application Data

(60) Provisional application No. 60/256,594, filed on Dec. 19, 2000.

(51) Int. Cl.
    G06F 9/44     (2006.01)
    G06F 9/54     (2006.01)
(52) U.S. Cl. .................. 719/316; 709/203; 709/219; 715/234
(58) Field of Classification Search ............ 709/203, 709/219; 715/513, 234; 719/316
    See application file for complete search history.

(56) References Cited

U.S. PATENT DOCUMENTS

| 6,064,382 A * | 5/2000 | Diedrich et al. ............. 715/700 |
| 6,446,109 B2 * | 9/2002 | Gupta ........................ 709/203 |
| 6,615,131 B1 * | 9/2003 | Rennard et al. ............. 701/200 |
| 6,901,554 B1 * | 5/2005 | Bahrs et al. ................. 715/526 |
| 6,968,503 B1 * | 11/2005 | Chang et al. ................ 715/202 |
| 7,404,177 B1 * | 7/2008 | Greenfield et al. .......... 717/106 |

OTHER PUBLICATIONS

Ken Nordby, "What are Enterprise JavaBeans components? Part 1: The history and goals of EJB architecture," Jun. 22, 2000, pp. 1-8.*

* cited by examiner

Primary Examiner—Li B Zhen
(74) Attorney, Agent, or Firm—Krishnendu Gupta; Joseph D'Angelo

(57) ABSTRACT

A method for delivering applications over a network where the application's logic runs on the backend server and the application's user interface is rendered on a client-device, according to its display capabilities, thought a network connection with the backend server. The application's GUI API and event processing API are implemented to be network-aware, transmitting application's presentation layer information, event processing registries, and other related information a between client and server. The transmission is a high, object level format, which minimizes network traffic. Client-side events are transmitted to the server for processing via a predetermined protocol, the server treating such events and inputs as if locally generated. The appropriate response to the input is generated and transmitted to the client device using the format to refresh the GUI on the client.

20 Claims, 20 Drawing Sheets

710

Class com.nexaweb.server.ConnectionManager

```
package com.nexaweb.server;

import java.lang.*;
import java.lang.reflect.*;
import java.util.*;
import java.io.*;
import java.text.*;
import java.awt.event.*;
import java.awt.*;

import javax.servlet.*;
import javax.servlet.http.*;

public class HttpManager { protected static Hashtable threadList=new Hashtable();

public HttpManager() {return;} public synchronized static void put(String tname, ServletResponse httpResponse)
{
    threadList.put(tname,httpResponse);
} public synchronized static void remove(String tname)
{
    System.out.println("Removing entry for "+tname);
    threadList.remove(tname);
} public synchronized static void remove()
{Thread th=Thread.currentThread();
 String name=th.getName();
 threadList.remove(name);
} private static Object getConnection(String tname) {
    System.out.println("Get connection:threadList="+threadList+",name="+tname);

Object o=threadList.get(tname);
    System.out.println("Get connection:threadList="+threadList+",connection="+o);
    return o;
}
```

```
public static Object getConnection() {
Thread th=Thread.currentThread();
String name=null;
if(th instanceof AppServiceThread) {
/**
*in this case, the connection is stored into HttpManager in a parent thread
*, and the retrieving happens in a child thread
*/
    AppServiceThread ath=(AppServiceThread)th;
    name=ath.getParentThreadName();
    System.out.println("this is an AppServiceThread: parentName="+name);
}
else name=th.getName();
System.out.println("Tring to get connection by thread name="+name);
Object oo=getConnection(name);
/*Object po=oo;
    for(int I=0;true;) {break;
        if(po==null) break;
        System.out.println("Class is: "+po.getClass().getName()+"\n");
        po=po.getClass().getSuperclass();
    }
*/ try {
System.out.println("HttpManager:get connection:
="+oo+",oo.class="+oo.getClass().getName());
}catch(Exception ee) {System.out.println("Exception in HTTPManager:"+ee);}
return oo;
}
```

Class com.nexaweb.server.Nexel

```java
import java.io.*;
import java.text.*;
import java.util.*;
import javax.servlet.*;
import javax.servlet.http.*;
import com.nexaweb.server.*;

/**
*Nexel Application Presentation Server
*via Java Servlet Interface
*/
public class Nexel extends HttpServlet { public void doGet(HttpServletRequest request,
                HttpServletResponse response)
        throws IOException, ServletException
    {
        PrintWriter out = response.getWriter();

//App Launching Format: http://hostname:port/
servletname?appName=app1&user=user1;

String appName=request.getParameter("appName");
        String user=request.getParameter("user");

//App Messaging Format: http://hostname:port/
servletname?appid=appid&ctrlid=cid&key=key&eventid=eid&evparam=param
        String eid=request.getParameter("eventid");
        String appid=request.getParameter("appid");
        String cid=request.getParameter("ctrlid");

System.out.println("Servlet
Path="+request.getServletPath()+",servername="+request.getRemoteAddr()+"
port="+request.getServerPort()+",pathInfo="+request.getPathInfo()+",URI="+re
quest.getRequestURI()+",path translated="+request.getPathTranslated());

System.out.println("Request="+request.toString());
        System.out.println("Do post/Get:
eventid="+eid+",appid="+appid+",ctrlid="+cid);
        response.setContentType("text/html");

out.println("<html>");
        out.println("<body bgcolor=\"lightblue\">");
        out.println("<head>");

out.println("<title> Nexel Application Deliver Platform </title>");
        out.println("</head>");
        out.println("<body>");
        //out.println(rb.getString("requestparams.params-in-req") + "<br>");

if(eid!=null&&eid.length()>1&&appid!=null&&appid.length()>0) {
            dispatchEvent(request,response,appid,cid,eid);
            return;
        } if (appName != null && user != null) { out.println("Application="+appName);
            out.println("user="+user);
            launchApp(request,response,appName,user);

} else {
            //out.println(rb.getString("requestparams.no-params"));
        }
```

```
Class com.nexaweb.server.Nexel out.println("<P><h1>Nexel Application Delivery Platform Demo</h1>");
    out.print("<form action=\"");
    String action="http://"
+request.getServerName()+":"+request.getServerPort()+request.getRequestU
RI();

out.print(action+"\" ");
    out.println("method=POST>");
    out.println("AppName");
    out.println("<input type=text size=20 name=appName>");
    out.println("<br>");
    out.println("User");
    out.println("<input type=text size=20 name=user>");
    out.println("<br>");
    out.println("eventid");
    out.println("<input type=text size=20 name=eventid>");
    out.println("<br>");
    out.println("appid");
    out.println("<input type=text size=20 name=appid>");
    out.println("<br>");
    out.println("Control");
    out.println("<input type=text size=20 name=ctrlid>");
    out.println("<br>");
    out.println("<input type=submit>");
    out.println("</form>");

out.println("</body>");
    out.println("</html>");
}
public void doPost(HttpServletRequest request,
        HttpServletResponse response)
    throws IOException, ServletException
{
    doGet(request, response);
} protected void dispatchEvent(HttpServletRequest request,
        HttpServletResponse response,String appid,String cid,String eid)
    throws IOException, ServletException
{
    System.out.println("Dispatching event appid="+appid+",eventid="+eid);
com.nexaweb.server.EventManager.dispatchEvent(request,response,appid,cid,
eid);
    System.out.println("Finished Dispatching event
appid="+appid+",eventid="+eid);
}
```

```
protected void launchApp(HttpServletRequest request,
        HttpServletResponse response, String appName,
        String userName)
{
    System.out.println("Launching application : "+appName);

Thread thread=java.lang.Thread.currentThread();
    String tname=thread.getName();
    System.out.println("Working....Curent thead name ="+tname);

Vector argsV=new Vector();
    for(int i=0;i<100;i++) //maximum arguments is 100
    {String argi=request.getParameter("apparg"+i);
    System.out.println("arguments="+argi);
    if(argi!=null) argsV.addElement(argi);
    else break;
    }

String[] args=new String[argsV.size()];
    argsV.copyInto((Object[])args);
    Application app=new com.nexaweb.server.Application(appName,args);

app.setBaseURL("http://"
+request.getServerName()+":"+request.getServerPort()+request.getRequestU
RI());
    System.out.println("Application Base URL="+app.getBaseURL());

HttpManager.put(tname,response);
    System.out.println("HTTP
response="+response+",class="+response.getClass().getName());
    AppManager.addAppThread(tname,app.getAppId());

System.out.println("***************class="+response.getClass().getName()+",
of reponse?"+(response instanceof ServletResponse));
    try {
        app.start();
        System.out.println("Started Application......");
    }catch(Exception ee) {
        System.out.println("Nexaweb Application start exception: "+ee);
    }
    HttpManager.remove(tname); //remove it after done.
    AppManager.removeAppThread(tname);

//SimpleTest.main();
}
}
```

```
Class com.nexaweb.server.AppManager package com.nexaweb.server;

import java.lang.*;
import java.lang.reflect.*;
import java.util.*;
import java.io.*;
import java.text.*;
import java.awt.event.*;
import java.awt.*;

import javax.servlet.*;
import javax.servlet.http.*;

/**
 * class to hold all application instances
 */
public class AppManager extends java.lang.Object { protected static int appCount=0;
  protected static Hashtable appTable=new Hashtable();
  protected static Hashtable appThreads=new Hashtable();

public AppManager() {return;} public static String createNewAppId() {
      appCount++;
      return "Nx"+appCount+System.currentTimeMillis();
  } public synchronized static void addApp(Application app)
  { String key=app.getAppId();
    appTable.put(key, app);
  } public synchronized static void addAppThread(String tname,String appid) {
    appThreads.put(tname,appid);
  } public synchronized static void removeAppThread( String tname) {
    appThreads.remove(tname);
  } public synchronized static void removeApp(String appid)
  { Object app=appTable.get(appid); app=null;
    appTable.remove(appid);
    //appThreads.remove(appid);
  } public static Application getApplication(String appid)
  { if(appid==null) return null;
    Object app=appTable.get(appid);
    return (Application)app;
  } public static Application getApplication()
  {
    //System.out.println("Get application");
    Thread th=Thread.currentThread();
    String tname=th.getName();
    //System.out.println("Thread name="+tname);
    String appid=(String)appThreads.get(tname);
    //System.out.println("Application ID="+appid);
    return getApplication(appid);
  }

/**
   *a helper method to create a unique component ID for each compoent
   *(The uniqueness is only within the scope of the application)
   */
  public static String getUniqueComponentID() {
    Application app=getApplication();
    if(app==null) return "Can not find application";
    return app.getUniqueComponentID();
  }
}
```

Class com.nexaweb.server.Application

```
package com.nexaweb.server;

import java.lang.*;
import java.lang.reflect.*;
import java.util.*;
import java.io.*;
import java.awt.*;

/**
* Class to hold application information
* This is necessary since we change the threading model of java programs.
We don't maintain
* a main thread for each application any more. Our model is a service-based
model, each service
* is served in its own thread. Once the service finished, the thread will die.
* In order to keep different piece of an application together, we create an
Application class
* to achieve that, since different piece of the application will be handled in
different threads.
*
*/
public class Application extends java.lang.Object {
   protected String appName;
   protected String[] arguments;
   protected String appid;
   protected int componentCount=0;
   protected Hashtable listenerTable=new Hashtable();
   protected ThreadGroup group;
   protected String baseURL="";

/**
   *A table to hold all the GUI components that belong to this application
   */
   protected Hashtable ctrlTable=new Hashtable();

/**
   *A table to hold all other non-GUI components. This is needed when some
information
   * needs to be maintained during the entire application process, though the
thread
   * that created such information may have died.
   *
   *Eacha application instance is associated with one thread group. All threads
that belong
   * to this application belong to this thread group. This thread group has the
same name as
   * appid.
   *
   */
   protected Hashtable dataTable=new Hashtable();
```

```
   public Application(String name, String[] args)
     {String tname=Thread.currentThread().getName();
       appid=AppManager.createNewAppId();//tname+System.currentTimeMillis();
       //group=new java.lang.ThreadGroup(appid);
       group=Thread.currentThread().getThreadGroup();
       System.out.println("The thread group name for application
"+name+"="+group.getName());
       appName=name;
       arguments=args;

AppManager.addApp(this);
   } public String getAppId() {
       return appid;
   } public String getUniqueComponentID() {
       componentCount++;
       return "ctrl"+componentCount;
   } public void setAppId(String id) {appid=id;} public int getNumberOfComponents() {return componentCount;} public ThreadGroup getThreadGroup() {
       return group;
   } public String getThreadGroupName() {
       return group.getName();
   } public void setBaseURL(String s) {baseURL=s;}
   public String getBaseURL() {return baseURL;}
```

FIG. 17

```
Class com.nexaweb.server.Application
public synchronized void setApplicationVariable(String id, Object ctrl)
{ if(ctrl instanceof java.awt.Component) {//need to add an ID field for
Component class
    // System.out.println("Putting CTRL="+id+", Object="+ctrl+" into the CTRL
table");
        ctrlTable.put(id,ctrl);
    }
} public Object getApplicationVariable(String id)
{ return ctrlTable.get(id); } public void delApplicationVariable(String id)
{ ctrlTable.remove(id); } private String getListenerKey(String ctrlid, String eid) {
    return ctrlid+eid;
} public Vector getListeners(String ctrlid, String eventid) {
    String key=this.getListenerKey(ctrlid,eventid);
    Vector ls=(Vector)(listenerTable.get(key));
    return ls;
}

/**
*add a listener to be stored as application variable
*@param ctrlid, the id of the source compoent of the event
*@param eventid, the id of the event type
*@param listener, the listener object, who contains methods for event
processing
*/
public synchronized void addListener(String ctrlid, String eventid, Object
listener) {
    String key=this.getListenerKey(ctrlid,eventid);
    Vector ls=(Vector)(listenerTable.get(key));
    if(ls==null) ls=new Vector();
    ls.addElement(listener);
    listenerTable.put(key,ls);
    //System.out.println("Add Listener to Application:
ctrlid="+ctrlid+",eventid="+eventid+",listener="+listener);
}
```

```
public synchronized void removeListener(String ctrlid, String eventid, Object
listener) {
    String key=this.getListenerKey(ctrlid,eventid);
    Vector ls=(Vector)(listenerTable.get(key));
    if(ls==null) return;
    ls.removeElement(listener);
    listenerTable.put(key,ls);
} public void start() throws Exception
    {ClassLoader cl=this.getClass().getClassLoader();
    System.out.println("entry="+appName+",appid="+appid+",class
Loader="+cl);
    Class entry;
    if(cl!=null) entry=cl.loadClass(appName);
    else entry=Class.forName(appName);

System.out.println("entry="+appName+","+entry);

try {
        AppServiceThread thread=new AppServiceThread(this,entry,"main",null);
        System.out.println("thread="+thread);
        thread.run();
    }catch(Exception ex) {System.out.println("Application Start Exception:
"+ex);return;}

/**
    * thread.start();
    *We can not use thread.start() here because if you spawn off a new thread
to do the processing,
    * the original servlet service thread will just return and die. As a result, it wil
close the
    * HttpResponse connection.
    */
    }
}
```

Class com.nexaweb.server.EventManager

```
package com.nexaweb.server;

import java.lang.*;
import java.lang.reflect.*;
import java.util.*;
import java.io.*;
import java.text.*;
import java.awt.event.*;
import java.awt.*;
import javax.swing.*;

import javax.servlet.*;
import javax.servlet.http.*;

public class EventManager { public EventManager() {return;} public static int getEventID(String event) {
        if(event==null) return 0;
        /**
        *mouse events
        */
        if(event.equals("MouseDown")) return 10;
        else if(event.equals("MouseUp")) return 11;
        else if(event.equals("MouseOut")) return 12;
        else if(event.equals("MouseOver")) return 13;
        else if(event.equals("MouseDoubleClick")) return 14;
        else if(event.equals("MouseClick")) return 15;
        else if(event.equals("MouseDrag")) return 16;
        else if(event.equals("MouseDrop")) return 17;
        else if(event.equals("MouseMove")) return 18;
        /**
        *Action events
        */
        else if(event.equals("ActionEvent")) return 20;
        else if(event.equals("WindowEvent")) return 30;

else return 20000;
    } public static int stringToInt(String s) {
        Integer eInt=(new Integer(s));
        int I=0;
        if(eIntl=null) I=eInt.intValue();
        return I;
    } public static void dispatchEvent(HttpServletRequest request,
                HttpServletResponse response,
                String appId,String ctrlId, String eId)
        throws IOException, ServletException
    {
        System.out.println("Entering dispatch event method...");

Application app=AppManager.getApplication(appId);
        if(app==null) {
            System.out.println("Can not find application with ID="+appId);
        }

Vector v=app.getListeners(ctrlId, eId);
        if(v==null||v.size()<1) return;
```

```
        Thread thread=java.lang.Thread.currentThread();
        String tname=thread.getName();
        System.out.println("Working....Curent thead name
        ="+tname+",eventID="+eid+",ctrlID="+ctrlid);
        HttpManager.put(tname,response);
        AppManager.addAppThread(tname, app.getAppId());

Integer eInt=(new Integer(eid));
        int eventId=0;
        if(eIntl=null) eventId=eInt.intValue();
        System.out.println("Event ID="+eventId);

if(eventId==getEventID("MouseDown")) {
            processMouseEvent(app, eventId,ctrlid,v,request,response);
        }
        else if(eventId==getEventID("MouseOver")) {
            processMouseEvent(app, eventId,ctrlid,v,request,response);
        }
        else if(eventId==getEventID("MouseOut")) {
            processMouseEvent(app, eventId,ctrlid,v,request,response);
        }
        else if(eventId==getEventID("MouseDown")) {
            processMouseEvent(app, eventId,ctrlid,v,request,response);
        }
        else if(eventId==getEventID("MouseUp")) {
            processMouseEvent(app, eventId,ctrlid,v,request,response);
        }
        else if(eventId==getEventID("MouseDoubleClick")) {
            processMouseEvent(app, eventId,ctrlid,v,request,response);
        }
        if(eventId==getEventID("MouseClick")) {
            processMouseEvent(app, eventId,ctrlid,v,request,response);
        }
        else if(eventId==getEventID("MouseDrag")) {
            processMouseEvent(app, eventId,ctrlid,v,request,response);
        }
        else if(eventId==getEventID("MouseDrop")) {
            processMouseEvent(app, eventId,ctrlid,v,request,response);
        }
        else if(eventId==getEventID("MouseDrag")) {
            processMouseEvent(app, eventId,ctrlid,v,request,response);
        }
        else if(eventId==getEventID("MouseMove")) {
            processMouseMotionEvent(app, eventId,ctrlid,v,request,response);
        }
        else if(eventId==getEventID("ActionEvent")) {
            System.out.println("Action Event: Calling processActionEvent");
            processActionEvent(app, eventId,ctrlid,v,request,response);
            System.out.println("Action Event: Finished processActionEvent");
        }
        else if(eventId==getEventID("WindowEvent")) {
            processWindowEvent(app, eventId,ctrlid,v,request,response);
        }

HttpManager.remove(tname);
        AppManager.removeAppThread(tname);
        System.out.println("finished processing event. Thread="+tname);
```

METHODS AND TECHNIQUES FOR DELIVERING RICH JAVA APPLICATIONS OVER THIN-WIRE CONNECTIONS WITH HIGH PERFORMANCE AND SCALABILITY

CROSS REFERENCE TO RELATED APPLICATIONS

This application claims the benefit of U.S. provisional application Ser. No. 60/256,594 filed on Dec. 19, 2000 and entitled METHODS AND TECHNIQUES FOR DELIVERING RICH JAVA APPLICATIONS OVER THIN-WIRE CONNECTIONS WITH HIGH PERFORMANCE AND SCALABILITY which is commonly assigned and the contents of which are expressly incorporated herein by reference.

FIELD OF THE INVENTION

This invention relates to computing architecture, and more particularly to a method and apparatus for running applications business logic on a backend server, with the presentation layer of the application handled on the client device, and communications between the presentation layer and business logic layer via messages based on formats such as XML.

BACKGROUND OF THE INVENTION

The rapid growth of the web, including the Internet and the wireless web, brings tremendous challenges as well as opportunities. Though web-centric computing seems to be the inevitable future, there are great challenges not yet answered which include:

- The capability to support compelling applications within unpredictable network environments.
- The overwhelming complexities of web application development and deployment.
- The rapid growth and divergence of client environments including web browsers, PDAs, Handheld computers, and so on.

Accordingly, there is a need for an enabling platform that, for the first time, enables developers to write programs for one platform and deploy them anywhere, i.e., to any device in any environment, while empowering these programs with unmatched richness and performance even over thin network connection.

BRIEF DESCRIPTION OF THE DRAWINGS

Referring to the figures, wherein like numerals represent like parts throughout the several views:

Figure 20:
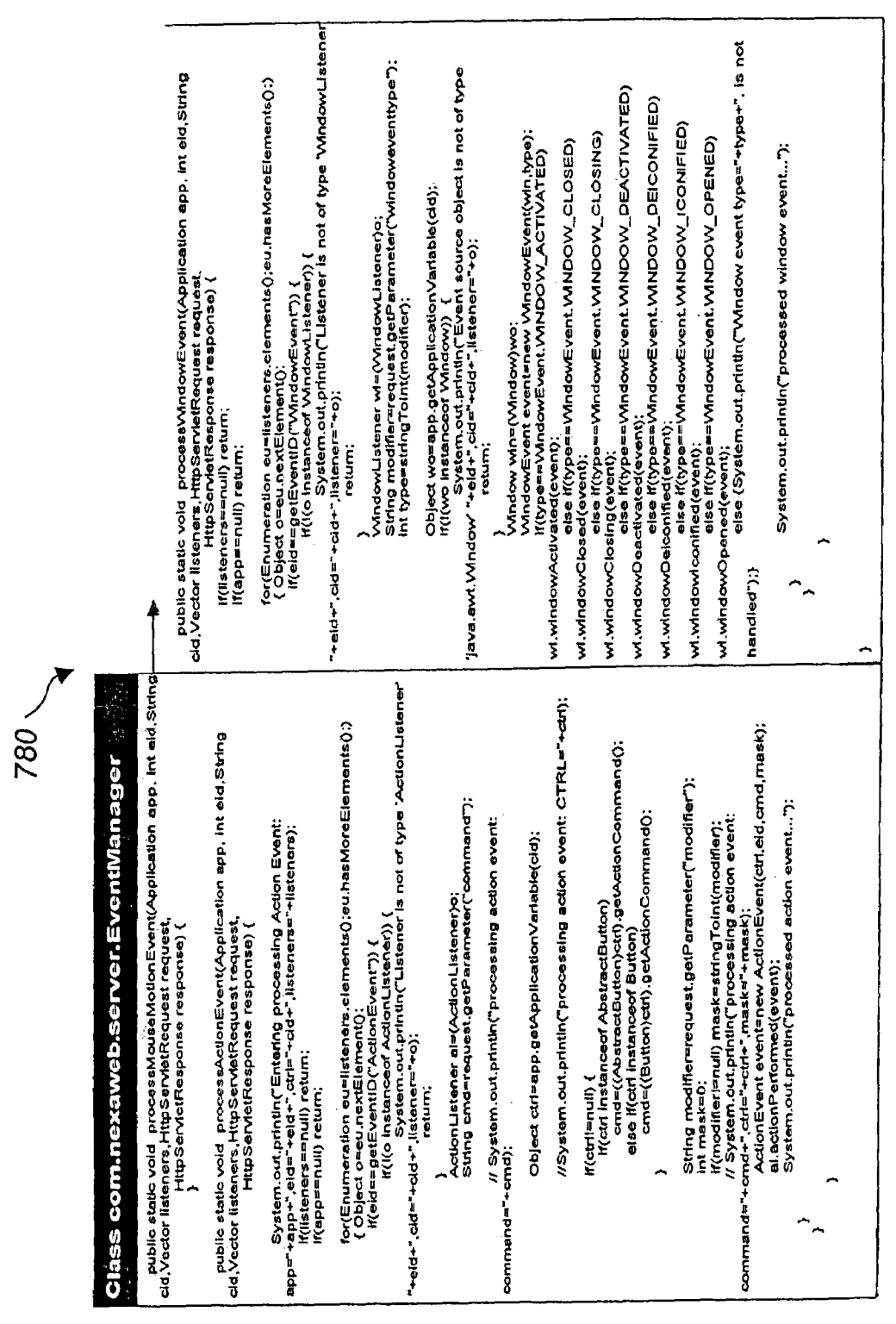

FIG. 13- FIG. 20 depict an example an implementation of the Nexel Core Classes.

DETAILED DESCRIPTION OF THE INVENTION

Nexel Server (or, Nexel Presentation Server) is the core of the Nexel Platform. The functionalities of Nexel Server for Java are:

- To manage and execute Java applications on the server;
- To adapt the User Interface (UI) of these Java applications according to the capability of the client environment, such as screen size and client computing power.
- To deliver the User Interface (UI) of these Java applications to the client computer over network;
- To dispatch user events from the client device to corresponding applications.

The engineering goals of Nexel Server for Java are:

- Compatibility with existing applications: Nexel Server is compatible with existing Java applications and is able to run existing Java applications without code modification;
- Zero learning curve: the Nexel Platform does not change how developers write programs and does not require developers to learn anything new. Existing Enterprise Java Bean (EJB) components, application server environments, database and so on can be used without change.
- Extreme scalability: each Nexel Server is able to run several thousands of Java applications concurrently.
- High performance: The Nexel Platform can deliver native-like performance over any network connection.
- Compatibility with Java 2 Enterprise Edition (J2EE) Application Server environments: Nexel Server is able to run together with J2EE Application Servers in a plug&play fashion. See white paper "The New Economy Enterprise Computing Architecture" for how Nexel Server and J2EE Application Server are complementary to each other in the new economy enterprise computing.

To achieve these goals, Nexel Server design takes the following approaches:

- A thread-based computing model (or, a service model). Each event handler in an application is invoked as a separate thread that dies after the event handling is finished. This is exactly the model that Java Servlet is using. Java Servlet has been used in major web sites for handling millions of hits a day. It is a proven scalable solution;
- Some of the state information is maintained on the client side. This releases server from maintaining all the information in memory;
- Multiple Java Virtual Machines (JVM) are utilized for large scale computing. These JVMs can be on different machines. As a result, they form a server farm that can scale to any requirement.

Nexel Server Kernel conforms to the Java Servlet API Specification. It can run within a web container from any J2EE application server.

1. Nexel Platform Architecture

Figure 1:
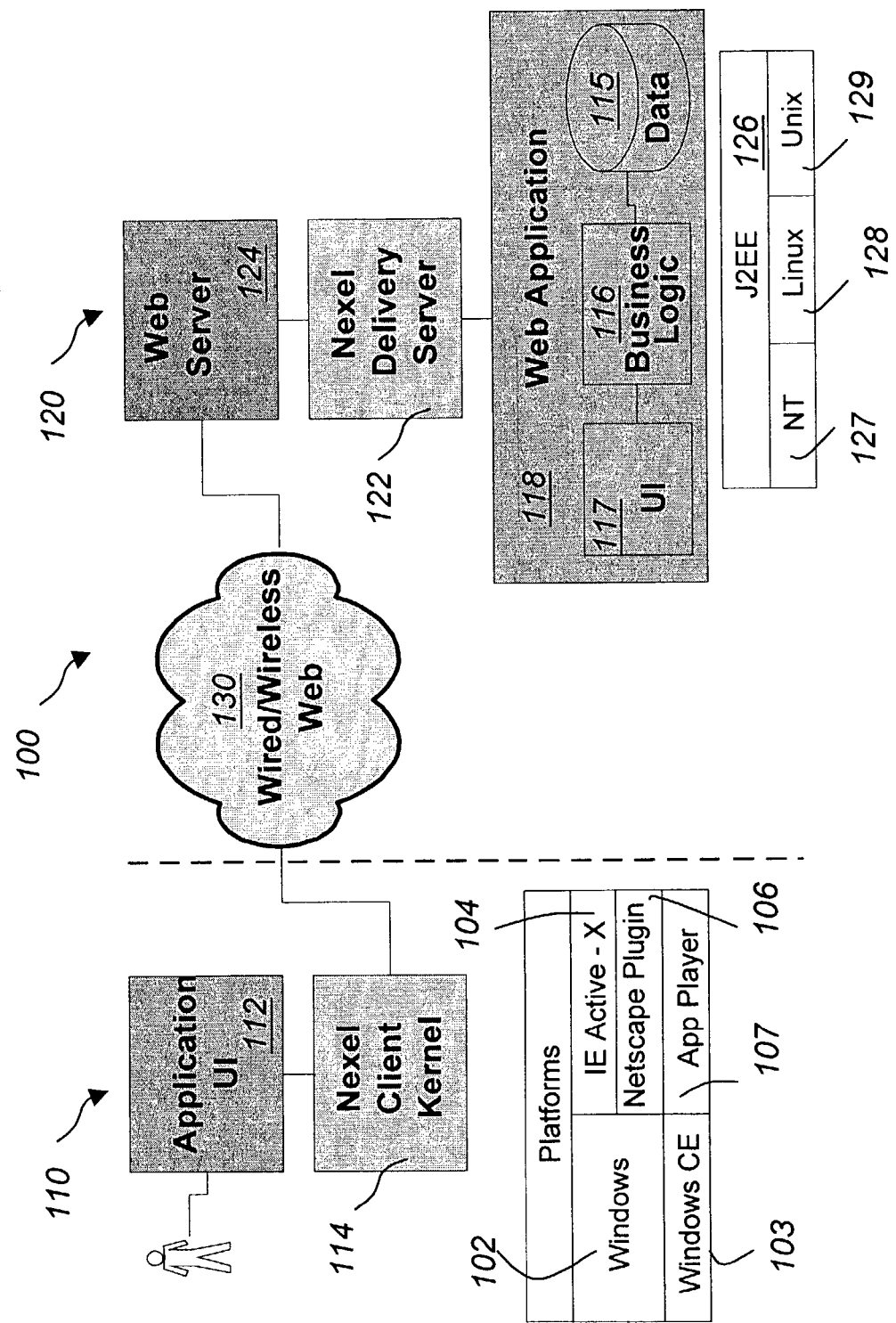
FIG. 1 is an overview diagram of the Nexel Platform architecture.

Nexel brings an innovative approach to application delivery. Applications are developed using Java and standard J2EE platform. Once these applications are deployed with the Nexel Delivery Server, they can be used anywhere on the web. The Nexel Delivery Server will present application UI on the client machine. The general architecture of the Nexel Platform 100 is shown in FIG. 1. Nexel consists of two parts. The server side part 120, that includes a "Delivery Server" 122. Its main responsibility is to interact with the application and extract its UI and communicate with a client part. The client side part 110, that includes a "Client Kernel" 114. Its main responsibility is to recreate an application UI 112 based on instructions from the server. Both these parts are described in detail in the following sections.

The Nexel server 122 works with any web server 124 that supports a servlet interface. It runs on top of the J2EE platform 126, which can be run on the Linux 128, Windows NT 127, Unix 129, Solaris, and HP-UX operating systems, among others. On the client side 110, players may be included for playing these applications. These players may be implemented on the Windows platform 102 with Internet Explorer 104 and Netscape 106 browsers. Also a proprietary player may be included in a Windows CE platform 103.

In addition to the delivery platform, we also offer the following tools:

| | |
|---|---|
| Development Tools | Layout Manager |
| Deployment Tools | |
| Migration Tools | Code Analyzer |

Each of these deliverables is described in detail in following sections. To understand the function of all these parts it is important to understand how applications are developed and deployed.

2. Application Development and Deployment Process

Nexel utilizes the existing process of developing applications for J2EE platform 126. In a three-tier architecture of an application 118 that includes data 115, business logic 116 and a UI 117, the data tier and business logic tier development process remain unchanged. You can use any database or file system as data tier and you can develop the business logic using Enterprise Java Beans or any other Java technology or technology which can be called from Java. The UI layer has to be developed using Java Foundation Classes (JFC) and Java. Many existing applications that use JFC for their UIs can be run in the Nexel environment without any modification. We also produce migration tools for identifying problems in running existing code in the Nexel environment. The typical process for developing and deploying includes the following steps:

a. Develop the data layer using enterprise databases and file systems.
  b. Develop business logic using enterprise java beans or using any other technology that can be called using Java.
  c. Develop the application UI using Nexel's JFC. You can use Layout Manager to layout your screens at this point. Decide which events to process and connect the Graphical User Interface (GUI) to business logic. At this point you can use Nexel's validation objects to process events on the client side.
  d. Install the Nexel application on the server using the Install Tool. You can customize the application UI for different client platforms using the Layout Manager. You can save these customizations into different files.

3. Application Launching and Communication.

Figure 2:
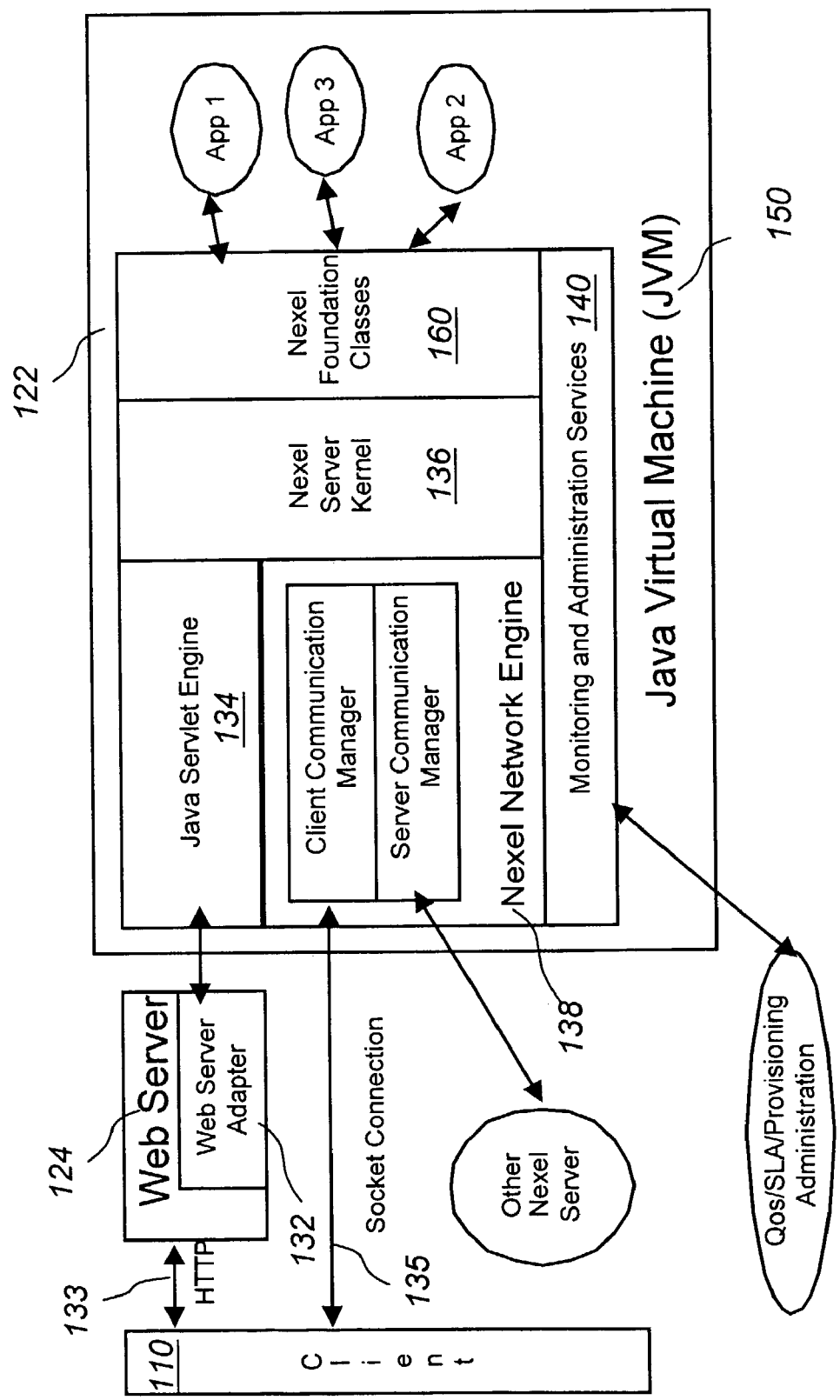
FIG. 2 is a block diagram of the Nexel Server.

It is also important to understand how applications are launched in Nexel environment. Referring to FIG. 2, communication between Delivery Server 122 and Client Kernel 114 go through the Web server 124 using standard HTTP/HTTPS protocol 133. A socket-based communication 135 may also be implemented for synchronous connection with the server. An application developer is able to choose the approach at development time. The sequence of events that occurs when a user wants to launch an application are:

1. User opens up the browser
  2. User types in URL for the login HTML page. This page includes two items
     a. User Name
     b. Password for the user.
  Once the user enters the data, the form is submitted to the server. The server checks the user name and password and sends a page with available applications.
  3. Each application has link setting with two query strings
     a. Application Name
     b. User Name
     Web servers that utilize servlet-programming models are supported. UI ServerServlet may be installed on the web server and will provide functionality to pass the message from client to UI Server. Once the user clicks on an application URL it is passed on to the server.
  4. Once the Nexel server receives commands to launch an application it will go through the following steps
     a. It will instantiate the application.
     b. Nexel server will also detect the type of client, which is invoking of the application and pass on to the application.
     c. A unique instance id will be assigned to application instance and pass on to the application.
     d. The application will run and it will talk to Nexel JFC API and create its UI. Nexel API will create a UI record format depending on the client type. At the end a record will be generated describing UI of the application.
     e. Nexel server encrypts the record if secure communication is used.
     f. Nexel server will respond to the user with the UI record.
  5. Once the Client Kernel receives the UI record it will go through the following steps
     a. The client communication manager will read the UI record. It will decrypt the record if necessary.
     b. The client will read and parse the UI record.
     c. The client will convert the record into various UI commands and create the necessary components. Fill them with the data provided and setup event-monitoring mechanism.
     d. The application is now displayed on the client screen
  6. The Client Kernel will then monitor for all the events. When an event occurs it will find out whether it has to take any action. The action could be in two forms.
     a. Run the specified code on client side itself for that event. The code is specified using validation controls.
     b. Notify the server of the event.
  The Client Kernel will take necessary action depending on the Application. If the event has to be notified to the server then the event processing happens on the server side. The server goes through the following steps once it receives the notification.

a. The server executes the method in the application, which is monitoring the events.

b. The server will monitor all the UI changes and converts them in UI record format.

c. It responds to the Client Kernel with that.

The client Kernel then goes through the process of updating UI. See steps 5.a through 5.d for details.

7. When user quits the application Client Kernel shuts down and notifies the server.

8. When the server receives a message to quit it shuts down the application instance.

When Synchronous communication is a requirement, the UI server includes a port number to which the client needs to establish the connection. Before creating any UI it connects to this port. Once the socket connection is established it is used for communicating later.

4. Nexel Delivery Server.

4.1 Platforms.

Nexel Server is implemented using Java technology. It supports all the major web servers on major platforms, including Microsoft Internet Information Server (IIS) on Windows, Apache Web Server on Windows, Solaris, HP-UX, AIX, and Linux, Java Web Server on Windows, Solaris, AIX, and Linux, and Netscape Enterprise Server on Solaris, Windows, Linux, HP-UX, and AIX.

4.2 Nexel Server Architecture

Nexel Server 122 includes five sub systems 132, 134, 136, 138, and 140, shown in FIG. 2. Their core functionalities are shown in the following table 1. Note that two sub systems, Web Server Adapter 132 and Java Servlet Engine 134, are standard and available freely. Open source code, such as Tomcat/Jakarta project from Apache Software Foundation, may also be used. A simplified Java Servlet Engine, a simple Java Web Server, and adapters from IIS, Apache, Netscape Web Server, are included as part of our product.

TABLE 1

| Name | Functionality | Note |
| --- | --- | --- |
| Web Server Adapter (132) | Communicates with the Java Servlet Engine, such as routing requests to and responses from the Servlet Engine. | We can also use Java Web Server from the Tomcat Project. |
| Java Servlet Engine (134) | Provides a standard interface for Nexel Server Kernel to interface with web servers. This standard interface is Java Servlet API. Provides thread management capability. Including: 1). Maintaining a thread pool; 2). Assigning or creating a thread to each request, and invokes the "service" method in Nexel Server Servlet from this thread. | The Servlet Engine can be any Servlet Engine, such as Jrun and WebLogic. We can also use Tomcat/JWSDK. |
| Nexel Server Kernel (136) | Instantiates other Nexel components such as AppManager, ConnectionManager, EventManager and so on. Keeps these components within memory all the time; Launches applications; If necessary, launches another Nexel Server. Event (comes from Servlet requests) dispatching. | Written entirely in Java. |

TABLE 1-continued

| Name | Functionality | Note |
| --- | --- | --- |
| | Generates and sends application user interface description into Servlet responses. If necessary, re-do application user interface layout according the client display characteristics. | |
| Nexel Network Engine (138) | Accepts and creates synchronous socket connections to clients directly, by passing the Servlet Engine and Web Server; Thread management: Maintain a separate thread pool. Whenever a new request is received, creates a ServletRequest and a ServletResponse object, calls the Servlet "service" method within a separate thread; returns this thread back to thread pool after the "service" method returns; Communicates with other Nexel Server instances within other Java Virtual Machines through socket connections. The goal of such communication is to route requests/responses to different JVMs such that one JVM won't be overloaded. | Written entirely in Java. Open source code from Tomcat project can also be used. |
| Monitoring and Administration Service (140) | The Monitoring and Administration Service is responsible for keeping track of information about an Application Instance. Following information needs to be tracked. a. Application Name. b. Application Instance Identifier. c. User accessing the application. d. Client machine information. I. Machine IP II. Device Type. III. Connection Speed. e. Application start time. f. Application last access time. g. Memory usage. h. Active Screen Name | |

Nexel Server Kernel 136 is composed of three major parts:

4.2.1 Nexel Core Classes

Nexel(com.nexaweb.server.Nexel), AppManager,EventManager,JVMManager,UIManager, ConnectionManager,PerformanceManager.

Figure 3:
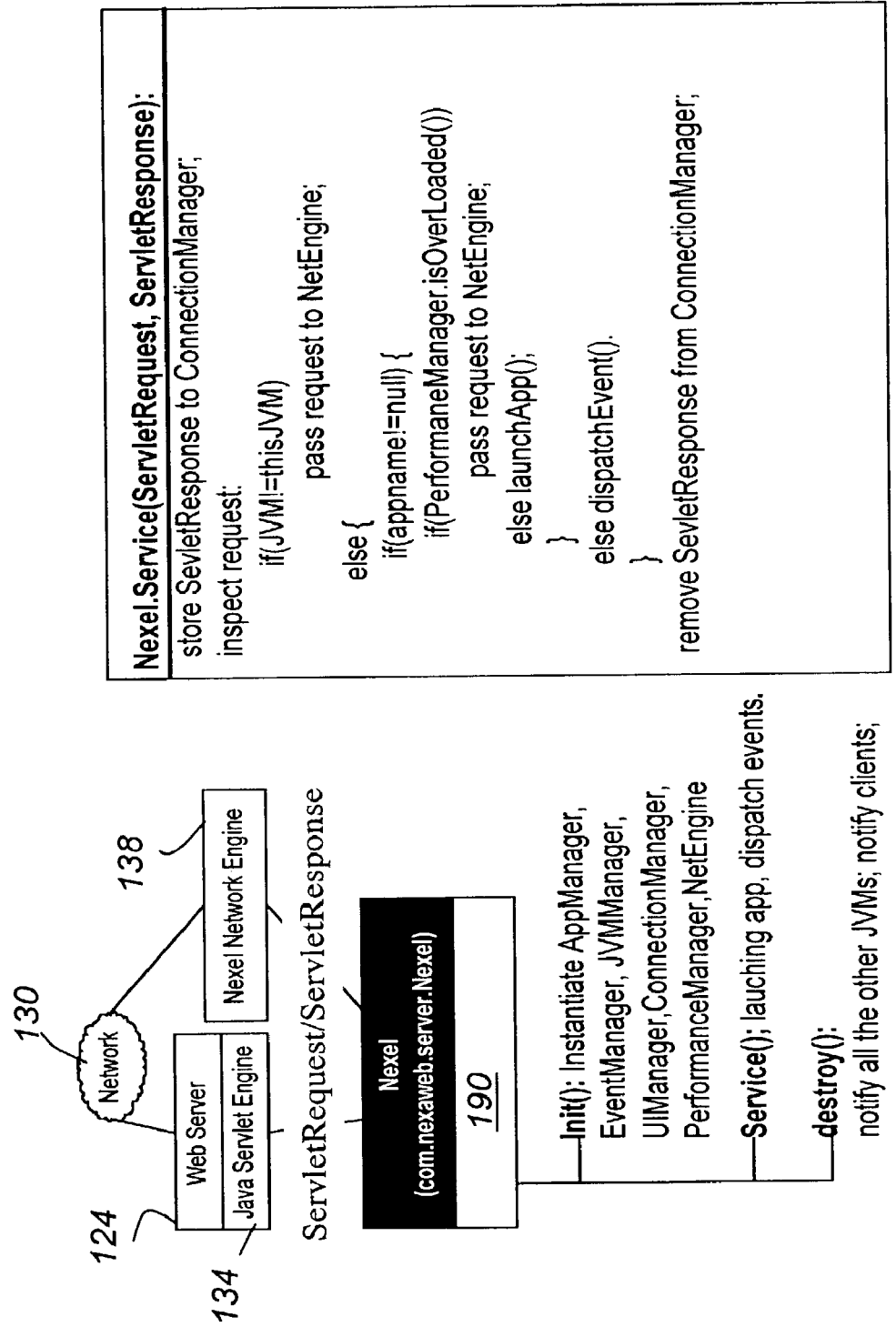
FIG. 3 is a block diagram of the Nexel Server interfacing with a Servlet Engine via the Nexel Servlet.

Class com.nexaweb.server.Nexel 202: This class is the main class. This class extends javax.servlet.GenericServlet. As a result, it should run with any Java Servlet Engine. FIG. 3 gives an overview of the functionalities of this class.

Class com.nexaweb.server.AppManager: This class manages all the applications within this Java Virtual Machine. Each application is represented as an instance of Class com.nexaweb.server.Application. AppManager maintains a table of applications that can be searched by application ID. It also provides methods for getting the current application.

Class com.nexaweb.server.Application: This class maintains the persistent data between different threads within one application. It maintains the application ID, a Hashtable of components(Objects) that each component can be located by a unique component ID, a Hashtable of event listeners that each listener can be located by a component ID and an event ID. EventManager and other objects will use these IDs to get access to their interested objects. The Application class should also maintain an event queue for processing events coming from different threads. See 4.3 Thread-based computing for further information.

Class com.nexaweb.server.EventManager: this class maintains a map between event ID and the actual event type. It also does the actual event dispatching: for a ServletRequest, it retrieves appid (application ID). Then it finds the application instance from AppManager by using the appid. It also retrieves the event ID and component ID from the ServletRequest. As last, it constructs corresponding Java Abstract Window Toolkit (AWT) or Swing events and sends the event to the Application object for processing.

Until the Application object finished the event processing, EventManager should make the current thread idle instead of returning to its caller. After the Application object finished processing this event, the current thread will be destroyed (or recycled).

Class com.nexaweb.server.JVMManager: this class maintains a Hashtable of running Java Virtual Machines (each of which has Nexel Server running). The key to the Hashtable is the IP address of the host where the JVM is running and the main port number that the Nexel Network Engine is assigned to listen to during its startup. During event processing, Nexel servlet first check whether this event is for the current JVM. Otherwise it will simply routes the ServletRequest to the corresponding JVM. This class provides methods for setting/getting JVM id and methods for routing requests to different JVMs.

Class com.nexaweb.server.ConnectionManager: This class maintains a Hashtable of ServletResponse instances. Each instances corresponds to a socket communication channel. Each instance can be uniquely located by the name of the thread that this instance belongs to. This class is necessary because the ServletResponse instance cannot be passed to event handlers and UI Objects directly. Event handlers and UI Objects should use this class to find the socket to send information to clients.

Class com.nexaweb.server.UIManager: This class is a replacement of javax.swing.UIManager. It loads a UI class corresponding to the client platform for painting.

Class com.nexaweb.server.PerformanceManager: This class provides methods for gauging the performance level of the current JVM. Methods in the class will be used for developing monitoring applications and making load balancing decisions. For example, if the performance level of the current JVM is below a certain threshold, the Nexel servlet may simply creates a new JVM for handling additional user applications.

One implementation of the above classes is shown in Tables 46-48.

4.2.2 Nexel Java Foundation Classes

Java Foundation Class, or JFC, is a loose collection of standard Java APIs for client-side graphics; graphical user interfaces (GUIs), and related programming tasks. They are the foundation classes in the sense that most client-side Java applications are built upon these APIs. More in detail, JFC includes the following parts:
1. AWT. The Abstract Window Toolkit initially introduced. AWT is the foundation of Swing.
2. Swing. Swing is an advanced GUI toolkit written in pure Java.
3. Java 2D: this is a collection of classes offer two-dimensional graphics.
4. Printing. Both AWT and Swing offer support for printing text and graphics.
5. Data transfer, this includes cut &paste and drag drop.

Figure 4:
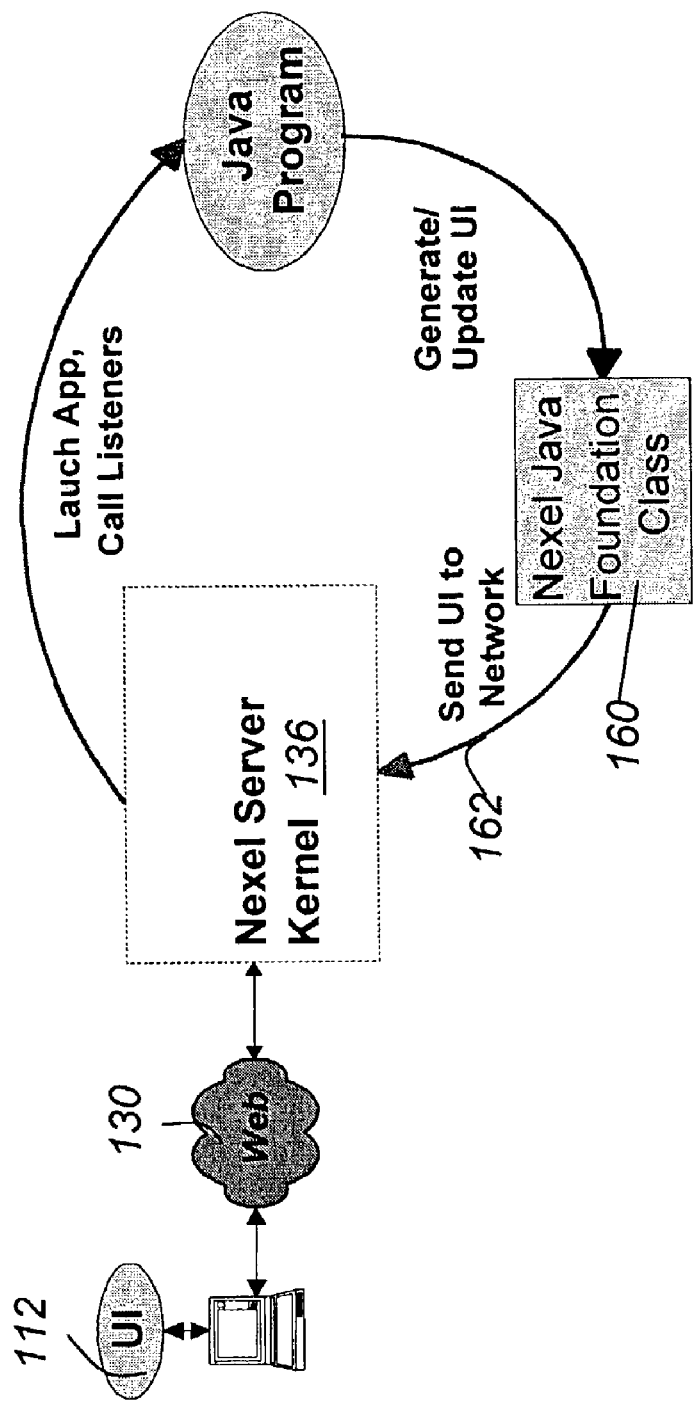
FIG. 4 is a block diagram of the Nexel Server interacting with a standard Java application.

Nexel is an enterprise application presentation platform that delivers an application user interface to any device over any network connection, without modifying existing Java applications. Java applications typically build their UI on top of Java Foundation Class. Nexel modifies the behavior of JFC by replacing part of the implementation with its own implementation. This modified JFC is called "Nexel Java Foundation Class"160, shown in FIG. 4. Instead of painting UI on local computer screen, Nexel Java Foundation Class directly sends UI commands and directives 162 to the client device 112 over a network connection 130. However, Nexel Foundation Class keeps exact the same interface as Java Foundation Class. Namely, for any method in any class, they have the same signature. The only difference is the implementation of these methods. As a result, existing Java applications built using JFC can run as it is without modification. Developers can develop applications to run on top of Nexel without the need of learning anything new.

In the initial implementation, Nexel aims to support Swing and/or Java 2D based Java applications, but not AWT-based GUI applications. Nexel also plans to support printing and data transfer.

4.2.3 Technical Approach to implement NJFC

JFC is implemented by following a Model-View-Controller architecture. Each JFC component has a Model, a view and a controller. For example, for the JButton component, its model is AbstractButtonModel, its controller is JButton and its view is JbuttonUI (depends on the look & Feel). Sometimes the controller is combined with the model into one class.

To successfully replace JFC, for each component, we need to re-implement:
1. The component itself (the controller). For example, JButton needs to be re-implemented to achieve three things: a) all event listeners will be added to the Application instance instead of storing within the JButton class itself. Nexel Client Kernel will only send message to Nexel Server if and only if there is an event listener registered for a particular kind of event. So when an event listener is added, a directive indicating that Nexel Server is interested in such event should be sent to the client. 2). Actions for updating/painting the JButton should be sent to UIManager and further sent to the client device; c). When this JButton is created, assign it a unique component ID and store it in the Application Instance.
2. It's UI Class (Viewer). For each client platform, a view class needs to be implemented. This view class will be loaded if the client platform matches. This dynamic loading is achieved by UIManager. UIManager needs to check the client platform and loads the view class for that client platform. For example, for JButton, we need to implement WinJButtonUI, MacJButtonUI, XwinJButtonUI, and WinCEJButtonUI.

The functionalities of this UI class are: a). to generate and send UI description of this component to Nexel Client Kernel via the ServletResponse object. The UI description is platform-dependent. It is a protocol that needs to be agreed between the Client Kernel and the UI class on the server side. b). to update UI on the client machine according server-side instructions. The update is accomplished by generating and sending a message describing what and how to update the component UI.

For painting, whether the target output is the client machine display device or a remote printer needs to be taken into design consideration. For more information, see Design Specification "Nexel Client Kernel".

3. The existing JFC Model classes are used in Nexel Java Foundation Class without modification.

Figure 5:
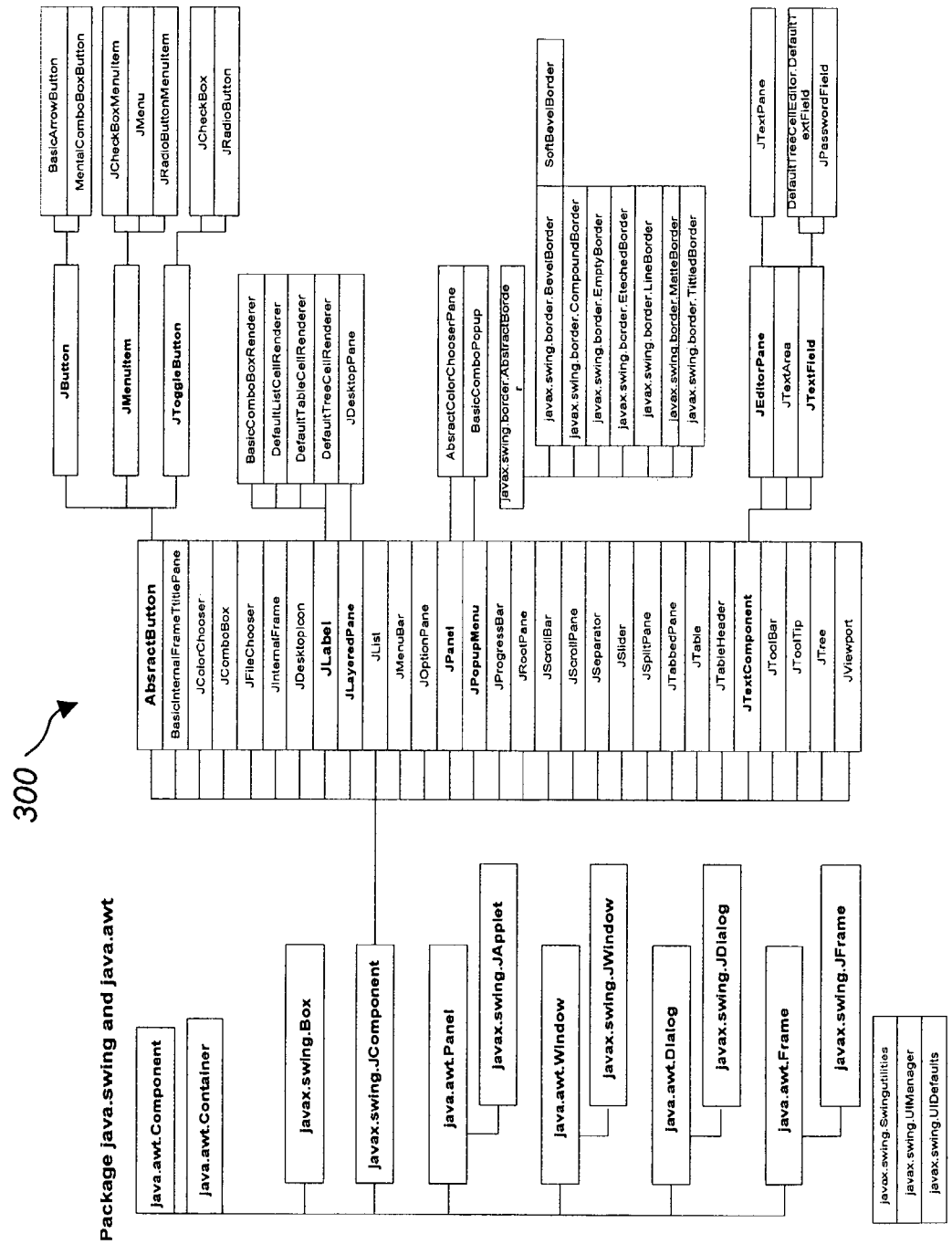
FIG. 5 is a block diagram of the Nexel Swing components.

A list of Swing components 300 that we need to replace is shown in FIG. 5.

TABLE 2

New Components

| Component | Description |
| --- | --- |
| JRadioList | List Box with Radio buttons for each item |
| JCheckList | List Box with Check buttons for each item |
| JDate | Date editing Control |
| JCalendar | Calendar Control |
| JStatusBar | Status Bar Control |
| JValidation | Runs validation on control values on the client side |
| New Dialogs | |
| JPrintDialog | Printer selection dialog |

4.2.4 Nexel Layout Manager

Figure 6:
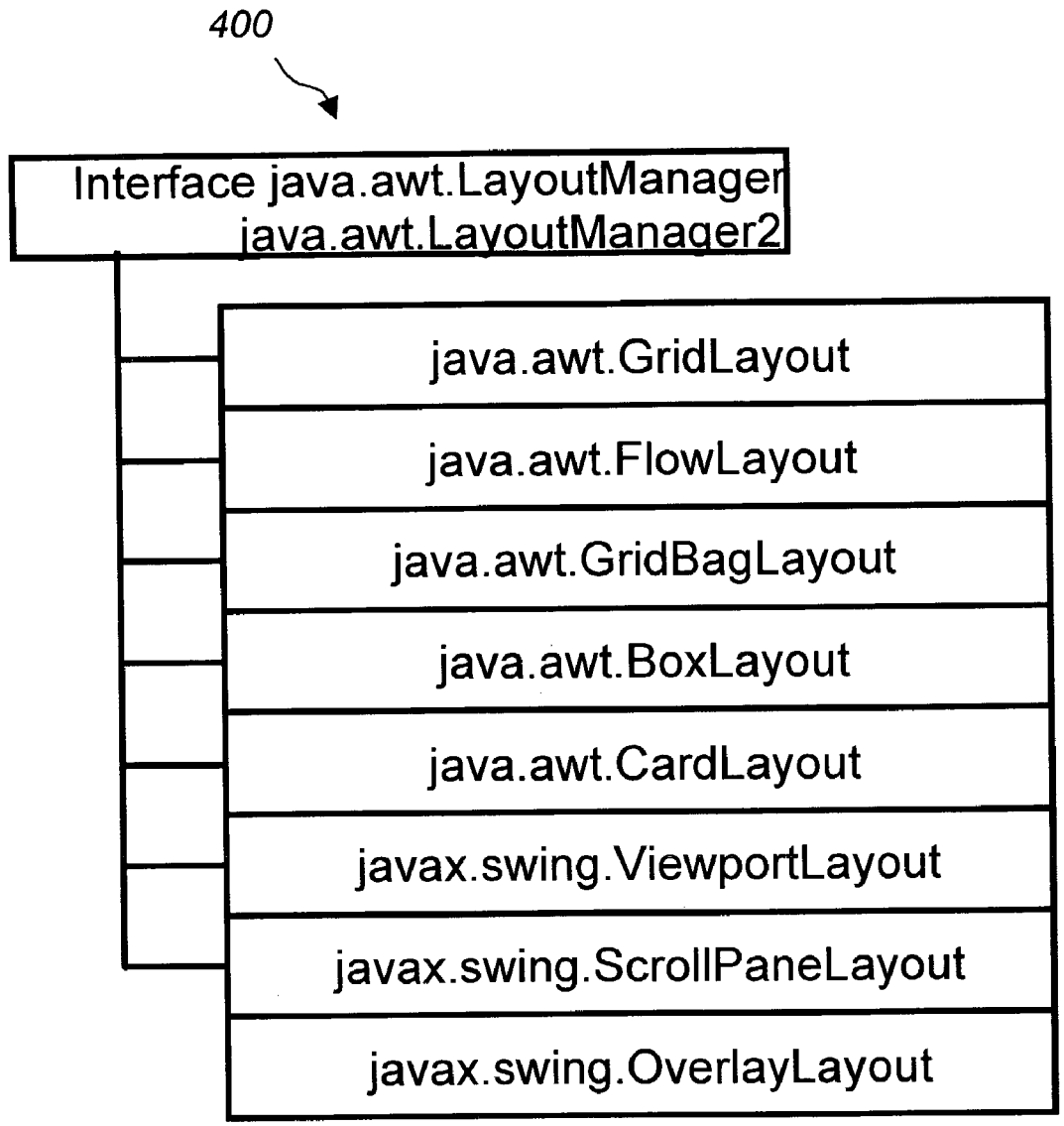
FIG. 6 is a block diagram of the Nexel Layout manager.

FIG. 6 shows a list of layout managers 400 that need to be replaced. Nexel Layout Managers should be adaptive to client display characteristics.

A deployment tool/design tool for laying out GUI components for different client devices is also provided. See "6 Nexel Client Display Engine" for more information.

4.2.5 Nexel Network Engine

Nexel Network Engine is packaged into one package com-.nexaweb.server.net. This package is responsible for direct synchronous communication with clients and other Java Virtual Machines that Nexel is running.

Class com.nexaweb.server.net.NetEngine:

This is one of the two entrances of the Nexel Server (The other one is via a Java Servlet Engine). This class creates instances of NexelServerSocket, each of which listens to a pre-determined port. It instantiates com.nexaweb.server.Nexel if it has not been instantiated; within a single JVM, only one instance of Main is allowed. If this JVM is started by another Nexel from a different JVM, this class's main method will be called with arguments that gives the IP address and port number corresponding to the calling JVM. Upon this JVM is started, a message should be sent to the calling JVM notifying "ready" status.

Class com.nexaweb.server.net.NexelServerSocket:

This class extends java.net.ServerSocket. The instance of this class listens to a specific port. Whenever it accepts a connection, it creates a new thread and lets the new thread (an instance of SocketHandler) handles that connection. Then it returns immediately to listening to that port.

Class com.nexaweb.server.net.SocketHandler:

This class extends java.lang.Thread. The instance of this class reads/writes to a socket connection. When reading, it formats the information into an instance of NexelServletRequest and wraps this socket connection into an instance of NexelServletResponse. Passes both objects to the "service( )" method in com.nexaweb.server.Nexel Servlet.

Class com.nexaweb.server.net.NexelServletRequest:

This class extends javax.servlet.ServletRequest. It basically wraps information coming from a socket connection into a ServletRequest Object so that they can be accessed using Java Servlet API.

Class com.nexaweb.server.net.NexelServletResponse:

This class extends javax.servlet.ServletResponse. It basically wraps a socket connection into a ServletResponse Object so that they can be accessed using Java Servlet API.

4.2.6 Additional Classes

The following classes will also be replaced:

1. Graphics 2D:

AWT provides basic graphics functionalities through instances of java.awt.Graphics. JFC further extends this by extending java.awt.Graphics into java.awt.Graphics2D. These two interfaces are responsible for all the drawing actions. We need to provide Nexel implementation of java.awt.Graphics and java.awt.Graphics2D interfaces. Whenever method getGraphics( ) is called( This method is from java.awt.Component, java.awt.Image, java.awt.PrintJob and javax.swing.Jcomponent), we should return an instance of Nexel implementation of java.awt.Graphics2D. This instance should route all the drawing activities to Nexel Client Kernel. Both AWT and Graphics2D provide additional classes such as java.awt.Rectangle and the entire java.awt.geom package for manipulating 2D graphics objects (such as affine transformation, setting/getting attributes and so on). These classes do not need to be modified.

2. Printing

AWT providing printing capability by java.awt.PrinterJob. JFC provides printing capability by offering a new package "java.awt.print". We plan to enable JFC-based printing. As a result, java.awt.print.PrinterJob needs to be re-implemented: a). Its static method "getPrinterJob( )" needs to be re-written so that a PrinterJob that represents the client machine printer is returned; b). Methods pageDialog( ) and printDialog( ) should open dialogs on client machine; c). Method print( ) should create an instance of java.awt.Graphics2D according to the characteristics of the client machine printer, and pass this instance as an argument for calling "print( )" method in the pageable or printable object. Every drawing action happening to the Graphics object should be routed to the client machine for printing.

3. Data Transfer

Data transfer refers to the ability of an application to transfer selected data I a variety of ways such as Cut&Paste and Drag&Drop. Nexel Platform plans to support both. We plan to support data transfer among different applications on the same client machine. These applications include Nexel-based applications and other native applications. This feature will be enabled by default and its implementation is dependent on the native system. Java provides two package called "java.awt.datatransfer" and "java.awt.dnd". We need to selectively implement classes in these packages to enable data transfer on remote client machine. Details need to be further studies.

4. Accessibility

This needs to be further studied. In the short term, we delegate accessibility to the native operating system on the client machine.

5. java.awt.Toolkit.

This class needs to be re-implemented based on Nexel's distributed presentation model.

The following classes will be added in addition to those offered by Java API:

1. Validation classes.

2. Other support classes.

4.2.7 Monitoring and Administration UI

The Monitoring and Administration UI is responsible for displaying the information tracked by the Monitoring and Administration Service. This UI will be developed using Java and JFC. Nexel server will be used to web enable this application. The application will contain main screen, which will have a table view displaying all the information. There will be a filter window to filter the entries in the table. The filter should be available for all the information types. This application should also be able to display the active screen in the application.

4.2.8 Thread-based Computing

Nexel is based on a thread-based computing model that every request for the client machine is handled in its own thread. Once the processing is finished, that thread will simply be destroyed or recycled for other usage. Nexel does not maintain a constant process or even a constant thread for an application during its entire session. This is the computing model used in Java Servlet and has proven to be very scaleable. However, for efficiency reasons, Swing components are not designed to be thread safe. This means that Swing components should be manipulated by a single thread at a time. Nexel Platform needs to pay special attention to this issue during design time:

1. Client-side initiated threads. When a client request is received, either the Java Servlet Engine or Nexel Network Engine will allocate a thread for handling this request. Once the request is processed, this thread will be freed. However, for different client requests, if they belong to the same application, they need to be processed sequentially though they are in different threads. An event queue for each application instance needs to be maintained.
2. Server-side initiated thread. There are times that developers need to update UI in response to some kind of eternal event, such as a response from a server that arrives in a separate thread. To accommodate these situations, Swing provides two utility methods that allow developers to ask the event queue to run arbitrary code. These methods are SwingUtilites.invokeLater( ) and SwingUtilities.invodeAndWait( ). Nexel platform needs to re-implement these methods since Nexel does not use the standard JVM event queue thread.

4.2.9 Performance.

Nexel has to provide application delivery at acceptable performance. The time is spent in following actions while running an application under Nexel environment.

a. Sending instructions from client to server to launch an application. This time should be same as other web application
b. Launch Application Instance. Attempt should be made to optimize this time, as it may be significant. One way to reduce this is to launch each application as a different thread rather than a new process with new JVM. This poses certain restriction on having static variables.
c. Extraction of UI. This time significantly depends on how the Component Framework is implemented. It should be very optimized to reduce the time it needs to record its UI.
d. Transferring UI to client. This time should be same as other web applications.

Even though it is very difficult to define the parameters at this time, the performance and scalability should be very close to HTML applications.

4.2.10 Scalability.

Nexel has to provide highly scalable applications. The server should be capable of running many application instances on server. Every application that is launched consumes certain amount of memory and the design should provide for ways to reduce this consumption. The ways to reduce this consumption are a. Serializing the application components to the disk. This frees up memory for new instances to be launched. This at the same time will effect in slower performance.
b. Allowing application to discard lot of component model memory, which is not needed. For example in a tree control, if the application only concern about the selected item, which could be received from the client, then it can discard the memory for other tree items.
c. Pooling many JVM or computers into a Server Farm. Nexel Server could run on many machines and it could use different machine to launch many instances.
d. Adding more web server machine to Web server installation. This feature is found in many Web Servers (e.g. IIS) and could be utilized.

Figure 7:
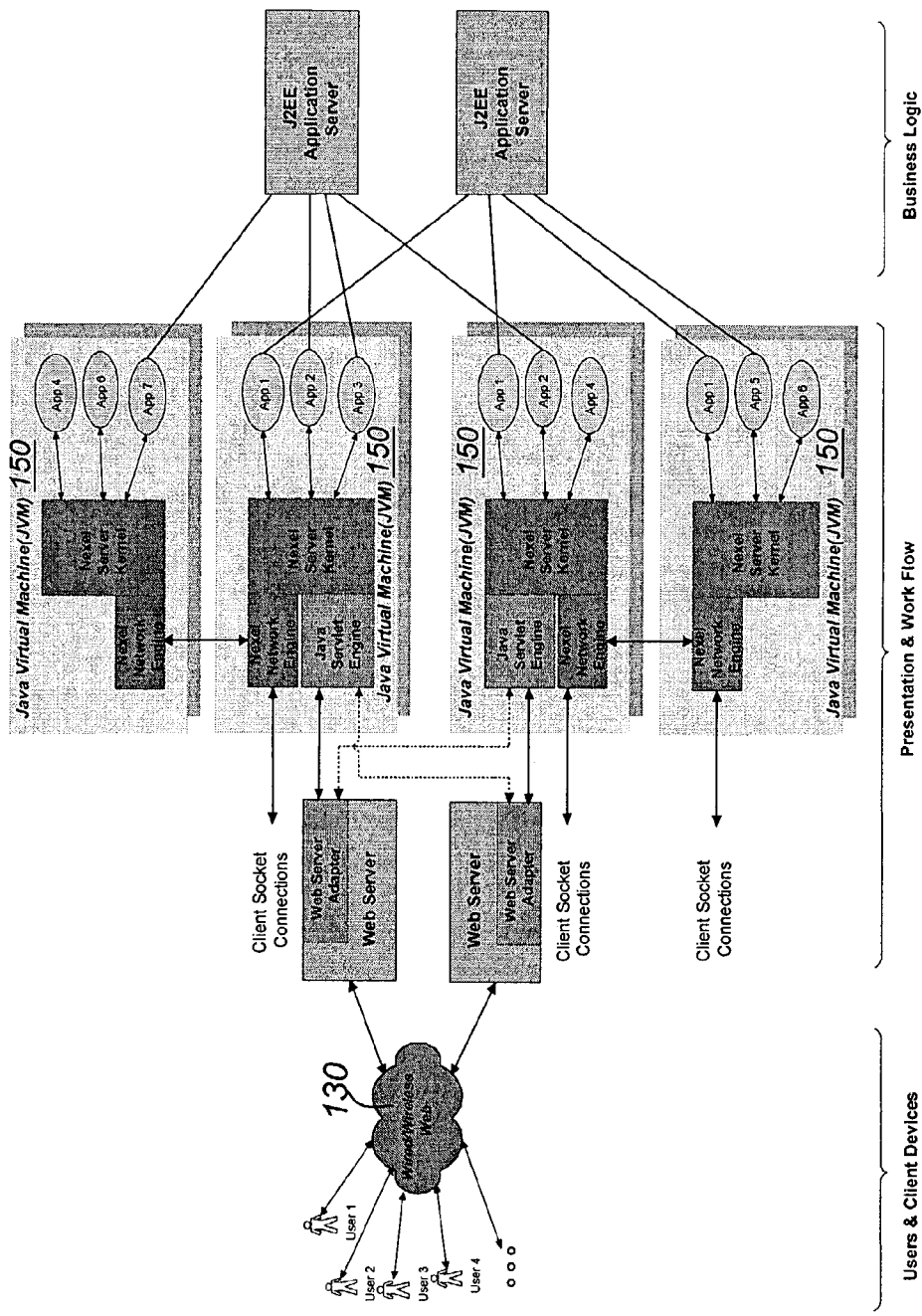
FIG. 7 is an overview diagram of an enterprise-scale deployment of the Nexel Platform.

FIG. 7 shows an enterprise-scale deployment of Nexel platform and its role in enterprise computing. Nexel Network Engine links different Nexel instances together and forms a high performance-computing environment with unlimited scalability. The diagram has two components

4.2.11 Restartability.

The applications run on the server machine should be accessible as long as they are running. If for any reason client breaks connection with the server, the same user which started the application should be able to recreate its UI. Server side application has to maintain information to be able to recreate UI. Some of the changes that user did on client side may not be retractable. The client kernel also reuse some of its cached information in order to recreate the screen.

5. Nexel Client Kernel.

Nexel Client Kernel 114 provides functionality to play the application UI on the client machine. It receives the instructions from the NexaWeb UI server for creating and updating the applications UI. It captures all the events and provides default response to events that are not handled by application. Applications could decide to handle events on client side or server side depending on which Kernel will either execute specified code on client side of the application or notify the event on server side of the application. It will also wait for response from server and update the UI when asked. It also provides caching of an application UI on the client side

5.1 Nexel Client Kernel Platforms.

Client kernel needs to be implemented on many platforms that play an application UI. In one example, three platforms are targeted, shown in table 3.

TABLE 3

| Platform | Technology | Language for development |
|---|---|---|
| Internet Explorer | Active-X component | C++ |
|  | Applet | Java |
| Netscape Browser | Plugin | C++ |
| Windows CE | Proprietary player | C++ |

The same code base is expected for Active-X component, Netscape Plugin and Windows CE player. These players will be developed using C++ language and so the code base should be same. On windows platform ATL Windows classes should be used to implement

5.2 Nexel Client Kernel Architecture.

Figure 8:
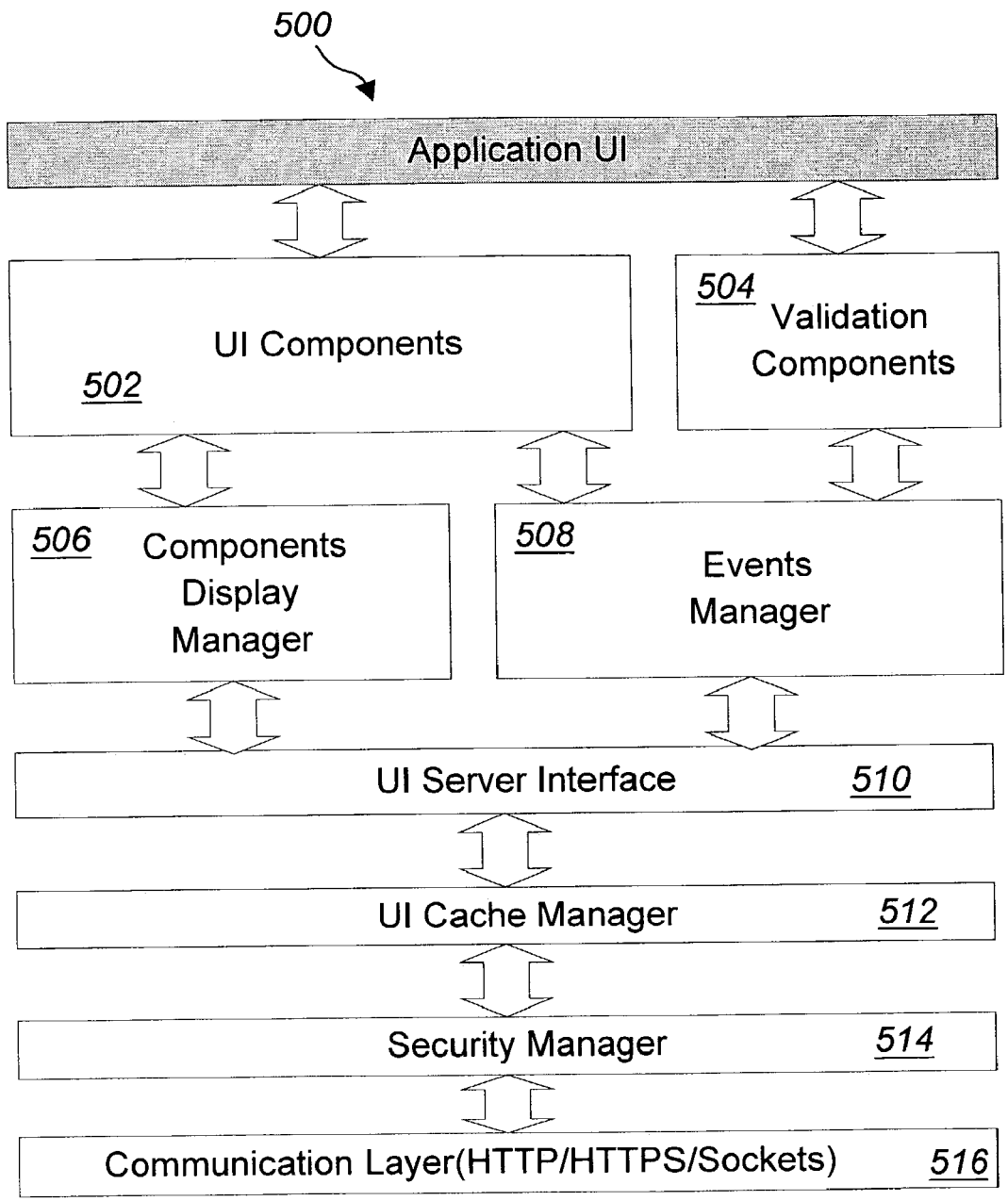
FIG. 8 is an overview diagram of the Nexel Client Kernel architecture.

The core functionality of the Client Kernel is to provide a rich Component Framework to create rich user interface. It creates instances of these components on the user's display and monitor events. The architecture 500 of Client Kernel is shown in FIG. 8 and is also summarized in Table 4 below.

TABLE 4

| | |
|---|---|
| UI Components (502) | This is a widget set that is implemented in the Kernel. It includes various widgets like button, window, tree etc. |
| Validation Components (504) | These are components provides functionality for simple validation of data. These components are invoked on specified events and they execute specified validation rules |
| Components Display/Update Manager (506) | This takes care of creating UI Components and updating them whenever necessary |
| Cache Manager (512) | This manages Client Kernel Caching as well as application UI caching on the client side. On Windows CE Platforms it should bring up an application even though it is not connected to the server. |
| Event Manager (508) | Event manager handles all the events |
| UI Server Interface (510) | This module convert the packets received from the server into various UI and event monitoring commands. |
| Security Manager (514) | Handles security for communicating with the server. This determines the protocol and encryption that will be used. |
| Communication Layer (516) | This layer provides services for communicating with the server. |

5.3 Security Manager.

The Security Manager 514 handles security for the communication records going to and from server to client. Standard security is used when a Web Server is involved. The HTTPS protocol is used to handle security. For socket-based communication, our own security mechanism is implemented.

5.4 UI Cache Manager.

The Cache Manager 512 has two purposes:

To cache the Client Kernel itself. The Kernel detects that there is a newer version of the Kernel available on the server and it downloads and runs that Client Kernel. For browser-based implementations, its own caching mechanism can be used. For non-browser based implementations such as Windows CE, it will have to be implemented.

To cache the application UI. An application name and its version will be used for caching. The code detects application versions on the server and client and if they match, it will not download its UI from the server. The server can disable the caching. The different windows that are opened during different events will also be cached. This feature can be used to play the UI on a client even if there is no connection to the server.

The cache manager uses a cache directory to save files. This directory will be identified by the Registry key on the windows platform:

HKEY_CURRENT_USER\Software\NexaWeb\Nexel\Cache Directory

Environment variable on other platforms:

NEXEL_CACHEDIR

The directory structure used for caching should look like this:

```
+ HOME
    + Application Name
        + Version
    – File1
    – File2
    – EventWindow.map
```

The directory contains a file EventWindow.map that keeps track of an event and the window that was opened due to the event.

6. UI Record Format.

The server sends the UI information to the client using this record format. Records are written in XML and packaged in text and transmitted over http protocol. This format may need tuning and can be changed to a compact binary format. The XML format is implemented, at least for testing purposes. The following principles are implemented:

Each application instance has an assigned identification number.

Each window is identified with an identifier from the server. This identifier is used in later communications for event handling and property changes.

Every control implements properties, methods and events of its base class. Window class is the base class for all the controls.

Every control is identified by a class name. This name is identified by the Widget name in UI Components table.

The control's properties are described after identifying a window.

The events that are to be handled are described later on.

Applications properties are listed in following table 5.

TABLE 5

| | | Application Properties | |
|---|---|---|---|
| Name | Description | Structure/Possible Values | XML Examples |
| Id | Identifier for App instance | | id=123 |
| Name | Application Name | | name="MyApp" |
| Version | Application Version | | version="1.0" |
| Cache | Use Caching | true, false | cache=true |

A typical record may look like this:

```
<nexawebapp id=123 name="myapp" version =1.0 cache=true>
    <window id=1>
        <bkcolor>yellow</bkcolor>
        <text>My First Application</text>
        <toolbar id=2>
            <button id=3 command=100>
                <text>New</text>
                <image>images/new. gif</image>
            </button>
            <button id=4 command=101>
                <text>Exit</text>
                <image>images/new.gif</image>
            </button>
        </toolbar>
        <oncommand id=100></oncommand>
```

-continued

```
        <oncommand id=101></oncommand>
    <window>
</nexawebapp>
```

6.1 Event Record Format.

The Event Record Format specifies how the event records are passed back to the server. Events are passed back with application ID and a Window ID. It also collects the properties that are specified to be collected.

A typical event record may look like this:

```
<nexawebapp id=123>
    <window id=1>
        <oncommand id=100 ></oncommmand>
    <window>
</nexawebapp>
```

7. Client Component Hierarchy.

Figure 9:
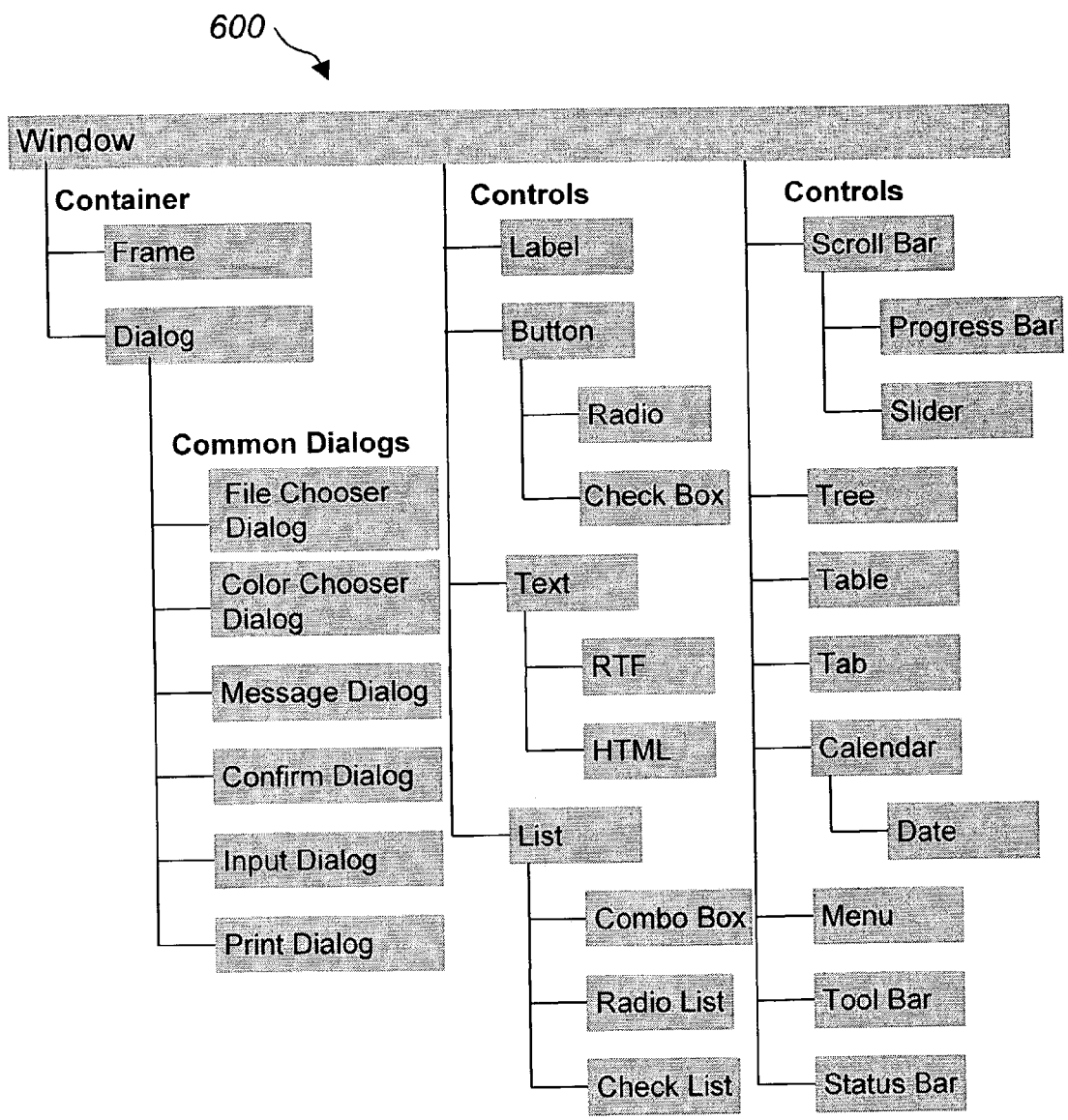
FIG. 9 is a block diagram of the Client component hierarchy.

The client component hierarchy 600 is shown in FIG. 9 and the following table 6 displays the UI Components that are supported. Each Control supports its properties, methods and events. The following section describes each control that is implemented by the Client Kernel.

TABLE 6

Components

| Widget Name | Window Equivalent | Description |
|---|---|---|
| Component | Window | Basic Window container |
| Dialog | Dialog | Dialog container |
| Frame | Frame Wnd | MDI Frame container |
| Label | Static | Caption or label control |
| Push Button | Button | Push Button Control |
| Radio Button | Button | Radio Button Control |
| Check Button | Button | Check Button Control |
| Text | Edit | Edit/Text Control |
| RTF | RichEdit | Rich Text Edit |
| HTML | DHTMLEdit | HTML control |
| List | ListBox | List Control |
| Combo Box | ComboBox | Combo Box control |
| Radion List | | List Box with Radio buttons for each item |
| Check List | | List Box with Check buttons for each item |
| Progress Bar | ProgressCtrl | Progress Bar Control |
| Slider | SliderCtrl | Slider Control |
| Tree | TreeCtrl | Tree Control |
| Table | ListCtrl | Table Control |
| Tabbed Dialog | Tab | Tabbed Dialog |
| Date | DateTimePicker | Date editing Control |
| Scroll Bar | ScrollBar | Scroll Bar Control |
| Calendar | Calendar | Calendar Control |
| Menu | Menu | Menu |
| Tool Bar | ToolBar | Tool Bar control |
| Status Bar | StatusBar | Status Bar Control |
| Dialogs | | |
| Message Dialog | MessageBox | Message dialog with OK and CANCEL button |
| Confirm Dialog | MessageBox | Confirm Dialog with YES, NO, CANCEL buttons |
| Input Dialog | | Input Dialog with one edit control |

TABLE 6-continued

| File Dialog | FileDialog | File Selection Dialog |
|---|---|---|
| Color Dialog | ColorDialog | Color Chooser Dialog |
| Print Dialog | PrintDialog | Printer selection dialog |

8. Nexel Communication Format.

Nexel provides many ways of communication between Client Kernel and Delivery Server. For each client type there could one implementation. In this release only one format is to be implemented. The communication happens in the UI record format and Event Record format. The following tables 7-46 describe the properties, methods and event that each component could have.

TABLE 7

Component Properties

| Name | Description | Structure/Possible Values | XML Examples |
|---|---|---|---|
| location | Window Location | Left, top, width, height Left or top = −1 locate anywhere Width or height = −1 freely size | location="10,10,−1−1" |
| bkcolor | Background color | Color Value | bkcolor=red |
| textcolor | Foreground color | Color Value | textcolor=green |
| state | Window state | minimized maximized normal | state=normal |
| minimizebox | Window has minimize box | True,false | minimizebox=true |
| maximizebox | Window hax maximize box | true,false | maximizebox=true |
| cancelbox | Window has cancel box | true, false | cancelbox=true |
| systemmenu | Window has system menu | true, false | systemmenu=true |
| visible | window is visible | true,false | visible=true |
| enabled | window is enabled | true,false | enabled=true |
| contexthelp | Window has help button | true,false | contexthelp=false |
| text | Window title/caption/text | | text="My window" |
| border | Window border | none fixed dialog sizeable | border=none |
| focus | Window has focus | true/false | focus=true |
| font | Window font | see font description | |
| icon | Window Icon | value | icon="images/icon.gif" |
| cursor | Mouse pointer | | cursor="images/hand.gif" |
| helpurl | Help URL | | helpurl="help/mywindow.htm" |

TABLE 7-continued

Component Properties

| Name | Description | Structure/Possible Values | XML Examples |
|---|---|---|---|
| flash | Flash Window | true, false | flash=true |
| tooltiptext | Tool Tip Text | | tooltiptext="Here is my tooltip" |

Methods

| Name | Description | Parameters | XML Examples |
|---|---|---|---|
| print | Print the window | | <print></print> |
| center | Center Window | window id | <center id=10 ></center> |
| redraw | Redraw Window | | <redraw></redraw> |
| move | Move Window | left,top,width.height | <move>10,10,-1,-1 </move> |
| show | Show Window | | <show></show> |
| moveto | Move Drawing point | | <moveto x=10 y=10> </moveto> |
| lineto | Draw Line | | <pen>...</pen> <lineto x=10 y=10> </lineto> |
| circle | Draw Circle | | <pen>...</pen> <brush>...</brush> <circle x=10 y=10 radius=20 fill=true > </circle> |
| rectangle | Draw Rectangle | | <pen>...</pen> <brush>...</brush> <rectangle x=10 y=10 width=20 height=20 fill=true> </rectangle> |
| polygon | Draw polygon | | <pen>...</pen> <brush>...</brush> <polygon points=10,10;20,20; 30,30 fill=true> </rectangle> |

Events

| Name | Description | Parameters | XML Examples |
|---|---|---|---|
| Onmousedown | | button, x,y | <onmousedown button=left x=10 y=20></mousedown> |
| onmouseup | | | <onmouseup button=left x=10 y=20></mouseup> |
| Onmousemove | | | <onmousemove x=10 y=20></mousemove> |
| onclick | | | <onclick button=left x=10 y=20></onclick> |
| ondblclick | | | < ondblclick button=left x=10 y=20></ ondblclick > |
| onactivate | window is activated | | <onactivate oldactiveid=122> </onactivate> |
| ondeactivate | window is deactivated | | <ondeactivate newactiveid=133> </ondeactivate> |
| Oncontextmenu | context menu is requested | | <oncontextmenu></on contextmenu> |
| onfocus | window is getting focus | | <focus oldfocusid=111> </focus> |
| onkillfocus | window is loosing focus | | <onkillfocus newfocusid=111> </onkillfocus> |
| onhelp | help is invoked | | <onhelp></onhelp> |
| onkeydown | key is down | | <onkeydown key="b" shift=true alt=false ctrl=true> </onkeydown> |
| onkeyup | key is up | | <onkeyup key="b" shift=true alt=false ctrl=true> </onkeyup> |
| onkeypress | key is pressed | | <onkeypress key="b" shift=true alt=false ctrl=true> </onkeypress> |
| onresize | window is resized | | <onresize width=10 height=50> </resize> |
| onmove | window is moved | | <onmove left=10 top=20> </onmove> |
| oncommand | Window recieves a command | | <oncommand id=200> </oncommand> |

TABLE 8

Dialog

Properties

| Name | Description | Structure/Possible Values | XML Examples |
|---|---|---|---|
| modal | Dialog is modal | true/false | modal=true |

Methods

| Name | Description | Parameters | XML Examples |
|---|---|---|---|
| reset | reset the dialog | | <reset></reset> |

Events

| Name | Description | Parameters | XML Examples |
|---|---|---|---|
| submit | Submit dialog | | <submit></submit> |

TABLE 9

Frame

Properties

| Name | Description | Structure/Possible Values | XML Examples |
|---|---|---|---|
| splitdir | Split Direction | horz,vert | splitdir=horz |

TABLE 9-continued

Frame

Methods

| Name | Description | Parameters | XML Examples |
|---|---|---|---|
| split | Split the frame | pane, no of panes | <split pane=0,1 panes=2></split> |
| attach | Attach Window | window | <attach windowid=100></attach> |

Events

| Name | Description | Parameters | XML Examples |
|---|---|---|---|

TABLE 10

Label

Properties

| Name | Description | Structure/Possible Values | XML Examples |
|---|---|---|---|

Methods

| Name | Description | Parameters | XML Examples |
|---|---|---|---|

Events

| Name | Description | Parameters | XML Examples |
|---|---|---|---|

TABLE 11

Push Button

Properties

| Name | Description | Structure/Possible Values | XML Examples |
|---|---|---|---|
| image | Image | image file name | image="images/yes.gif" |
| overimage | Image to be displayed when mouse is moved over | | overimage="images/no.gif" |
| downimage | button image when pushed down | | downimage="images/down.gif" |
| selected-image | button image when selected | | selectedimage="images/selected.gif" |
| imageloc | image location in reference to text | left,top,right,bottom | imageloc=top |
| imagealign | image alignment | left,right,top,center,bottom,vcenter | imagealign="top,center" |

TABLE 11-continued

Push Button

Methods

| Name | Description | Parameters | XML Examples |
|---|---|---|---|

Events

| Name | Description | Parameters | XML Examples |
|---|---|---|---|
| | Button is pushed | | <oncommand id=202></oncommand> |

TABLE 12

Radio Button

Properties

| Name | Description | Structure/Possible Values | XML Examples |
|---|---|---|---|
| selected | radio button is selected | true,false | selected=true |

Methods

| Name | Description | Parameters | XML Examples |
|---|---|---|---|

Events

| Name | Description | Parameters | XML Examples |
|---|---|---|---|

TABLE 13

Check Box

Properties

| Name | Description | Structure/Possible Values | XML Examples |
|---|---|---|---|
| checked | button is checked | true,false | checked=true |

Methods

| Name | Description | Parameters | XML Examples |
|---|---|---|---|

Events

| Name | Description | Parameters | XML Examples |
|---|---|---|---|

TABLE 14

Group Box

Properties

| Name | Description | Structure/Possible Values | XML Examples |
|---|---|---|---|

TABLE 14-continued

Group Box

Methods

| Name | Description | Parameters | XML Examples |
|------|-------------|------------|--------------|

Events

| Name | Description | Parameters | XML Examples |
|------|-------------|------------|--------------|

TABLE 15

Text

Properties

| Name | Description | Structure/Possible Values | XML Examples |
|------|-------------|---------------------------|--------------|
| multiline | whether multiline text | true,false | multilne |
| textlimit | number of characters allowed | number | textlimit=10 |
| editmask | mask to be used for editing | string | editmask="###.##.####" |
| datatype | type of data | string, number,date, currency,amount | datatype=date |
| outformat | output format | string | outformat="$%x" |
| align | Alignment | left,center,right | align=right |

Methods

| Name | Description | Parameters | XML Examples |
|------|-------------|------------|--------------|
| clear | Clear the text | | <clear></clear> |
| cut | Cut the selected text to clipboard | | <cut></cut> |
| paste | Paste from clipboard | | <paste></paste> |
| copy | Copy the selected text to clipboard | | <copy></copy> |

Events

| Name | Description | Parameters | XML Examples |
|------|-------------|------------|--------------|
| onchange | Text is changed | | <onchange text="1234"></onchange> |

TABLE 16

RTF

Properties

| Name | Description | Structure/Possible Values | XML Examples |
|------|-------------|---------------------------|--------------|

Methods

| Name | Description | Parameters | XML Examples |
|------|-------------|------------|--------------|

TABLE 16-continued

RTF

Events

| Name | Description | Parameters | XML Examples |
|------|-------------|------------|--------------|

TABLE 17

HTML

Properties

| Name | Description | Structure/Possible Values | XML Examples |
|------|-------------|---------------------------|--------------|

Methods

| Name | Description | Parameters | XML Examples |
|------|-------------|------------|--------------|

Events

| Name | Description | Parameters | XML Examples |
|------|-------------|------------|--------------|

TABLE 18

List

Properties

| Name | Description | Structure/Possible Values | XML Examples |
|------|-------------|---------------------------|--------------|
| listitem | List item description. many records repeated | text,image,data | <listitem text="xyz" image="images/checked.gif" data="avalue"></listitem> |
| selectedtext | Selected item text | | selectedtext="xyz" |
| selecteddata | Selected item data | | selecteddata="avalue" |
| itemcount | Number of items | | itemcount=10 |
| multiselect | Multiple selection Allowed | true,false | multiselect=true |
| sorted | List is sorted | true,false | sorted=false |

Methods

| Name | Description | Parameters | XML Examples |
|------|-------------|------------|--------------|
| additem | Adds a item | listitem | <additem text="xyz" data="abc"></additem> |

Events

| Name | Description | Parameters | XML Examples |
|------|-------------|------------|--------------|
| selchange | Selection Changed | | <selchange index=0 text="xyz" data="abc"></selchange> |

TABLE 19

Radio List

Properties

| Name | Description | Structure/Possible Values | XML Examples |
|---|---|---|---|

Methods

| Name | Description | Parameters | XML Examples |
|---|---|---|---|

Events

| Name | Description | Parameters | XML Examples |
|---|---|---|---|

TABLE 20

Check List

Properties

| Name | Description | Structure/Possible Values | XML Examples |
|---|---|---|---|

Methods

| Name | Description | Parameters | XML Examples |
|---|---|---|---|

Events

| Name | Description | Parameters | XML Examples |
|---|---|---|---|

TABLE 21

Scroll Bar

Properties

| Name | Description | Structure/Possible Values | XML Examples |
|---|---|---|---|
| direction | Progress direction | horz,vert | direction=vert |
| range | Range | low,high | range=100,200 |
| pos | Position | | pos=10 |
| linestep | Step | | linestep=10 |
| pagestep | Page Step | | pagestep=100 |

Methods

| Name | Description | Parameters | XML Examples |
|---|---|---|---|
| scroll | Scroll the bar by offset | | scroll=−10 |
| setscroll | Set the thumb | | setscroll=100 |

TABLE 21-continued

Scroll Bar

Events

| Name | Description | Parameters | XML Examples |
|---|---|---|---|
| poschange | Position Changed | | <poschange newpos=105> </poschange> |

TABLE 22

Progress Bar

Properties

| Name | Description | Structure/Possible Values | XML Examples |
|---|---|---|---|
| smooth | Smooth Scrolling bar | true,false | smooth=true |
| step | Step | | step=10 |

Methods

| Name | Description | Parameters | XML Examples |
|---|---|---|---|
| stepit | Advance | | <stepit numofsteps=10> </stepit> |

Events

| Name | Description | Parameters | XML Examples |
|---|---|---|---|

TABLE 23

Slider

Properties

| Name | Description | Structure/Possible Values | XML Examples |
|---|---|---|---|

Methods

| Name | Description | Parameters | XML Examples |
|---|---|---|---|

Events

| Name | Description | Parameters | XML Examples |
|---|---|---|---|

TABLE 24

Calendar

Properties

| Name | Description | Structure/Possible Values | XML Examples |
|---|---|---|---|
| daterange | Range in Calendar Control | from,to | <daterange from="1/1/99" to="2/2/00"></daterange> |
| date | Selected date | | date="1/1/00" |

TABLE 24-continued

Calendar

Methods

| Name | Description | Parameters | XML Examples |
|------|-------------|------------|--------------|

Events

| Name | Description | Parameters | XML Examples |
|------|-------------|------------|--------------|
| selchange | Date selection changed | | <selchange newdate="1/1/00"></selchange> |

TABLE 25

Date

Properties

| Name | Description | Structure/Possible Values | XML Examples |
|------|-------------|---------------------------|--------------|
| inputmask | Input Mask | | inputmask="mm/dd/yy" |
| outformat | Output Format | | outformat="dd-mmm-yyyy" |

Methods

| Name | Description | Parameters | XML Examples |
|------|-------------|------------|--------------|

Events

| Name | Description | Parameters | XML Examples |
|------|-------------|------------|--------------|

TABLE 26

Tree

Properties

| Name | Description | Structure/Possible Values | XML Examples |
|------|-------------|---------------------------|--------------|
| treeitem | Tree Item Structure | | <treeitem parent=0 id=1 text="abcd" image="open.gif" openimage="close.gif" selectedimage="selected.gif" children=1 data="ext111" state=expanded></treeitem> |
| selecteditem | Selected Tree Item | | <selecteditem id="1" text="abcd" data="ext111"></selecteditem> |
| rightclickitem | Item where right clicked | | <rightclickitem id="1" text="abcd" data="ext111"></rightclickitem> |

TABLE 26-continued

Tree

Methods

| Name | Description | Parameters | XML Examples |
|------|-------------|------------|--------------|
| insertitem | Insert Item | | <insertitem><treeitem>...</treeitem></insertitem> |
| deleteitem | Delete Item | | <deleteitem><treeitem>...</treeitem></deleteitem> |
| deleteall | Delete all items | | <deleteall></deleteall> |
| expanditem | Expand Item | | <expanditem id=1></expanditem> |
| selectitem | Select Item | | <selectitem id=1></selectitem> |
| sortchildren | Sort Children | | <sortchildren id=1></sortchildren> |
| ensurevisible | Ensure Visible | | <ensurevisible id=1></ensurevisible> |
| editlable | Edit Label | | <editlabel id=1></editlabel> |
| setitem | Set Item | | <setitem><treeitem>...</treeitem></setitem> |

Events

| Name | Description | Parameters | XML Examples |
|------|-------------|------------|--------------|
| begindrag | Begin Drag | | <begindrag id=1></begindrag> |
| enddrag | End Drag | | <enddrag id=1 droptarget=5 ></enddrag> |
| itemexpanded | Item expanded | | <itemexpanded id=1 text="xyz" data="as111"></itemexpanded> |
| itemexpanding | Item expanding | | <itemexpanding id=1 text="xyz" data="as111"></itemexpanding> |
| selchanged | Selection Changed | | <selechanged id=1 text="xyz" data="as111"></selechanged> |
| selchanging | Selection Changing | | <selechanging id=1 text="xyz" data="as111"></selechanging> |

TABLE 27

Table

Properties

| Name | Description | Structure/Possible Values | XML Examples |
|------|-------------|---------------------------|--------------|
| tablecol | Table Header Column | see table column | <tablecol>...</tablecol> |
| tablerow | Table Row | | <tablerow>...</tablerow> |
| tablecell | Table Cell | | <tablecell>...</tablecell> |
| selectedrows | Selected Row | | selectedrows=10,11,12,13 |

TABLE 27-continued

Table

Methods

| Name | Description | Parameters | XML Examples |
|---|---|---|---|
| insertrow | Insert Row | | <insertrow><br><tablerow>...</tablerow><br></insertirow> |
| deleterow | Delete Row | | <deleterow row=1><br></deleterow> |
| deleteall | Delete all Rows | | <deleteall><br></deleteall> |
| selectrow | Select Row | | <selectrow row=1><br></selectrow> |
| sort | Sort table | | <sort column=1></sort> |
| ensurevisible | Ensure Visible | | <ensurevisible row=1><br></ensurevisible> |
| setrow | Set Row | | <setrow row=1><br><tablerow>...</tablerow><br></setrow> |
| settablecell | Set Table Cell | | < settablecell row=1 col=5><br><tablecell>...</tablecell><br></ settablecell > |
| insertcol | Insert Column | | <insertcol after=1><br><tablecol>...<tablecol><br></insertcol> |
| deletecol | Delete Column | | <deletecol col=1><br></deletecol> |
| deleteallcol | Delete All Columns | | <deleteallcol><br></deleteallcol> |

Events

| Name | Description | Parameters | XML Examples |
|---|---|---|---|
| begindrag | Begin Drag | | <begindrag id=1><br></begindrag> |
| enddrag | End Drag | | <enddrag id=1 droptarget=5 ><br></enddrag> |
| selchanged | Selection Changed | | <selechanged id=1 text="xyz" data="as111"><br></selechanged> |
| selchanging | Selection Changing | | <selechanging id=1 text="xyz" data="as111"><br></selechanging> |

TABLE 28

Tabbed Dialog

Properties

| Name | Description | Structure/Possible Values | XML Examples |
|---|---|---|---|
| tab | Tab stucture | All button attributes and view attribute | <tab id=1 image="mytab.gif" text="abcd" view="abcd"></tab> |
| selectedtab | Selected Tab | | <selectedtab><br><tab>...</tab><br></selectedtab> |

TABLE 28-continued

Tabbed Dialog

Methods

| Name | Description | Parameters | XML Examples |
|---|---|---|---|
| inserttab | Insert Tab | | <inserttab><br><tab>...</tab><br></inserttab> |
| deletetab | Delete Tab | | <deletetab><br><tab>...</tab><br></deletetab> |
| deleteall | Delete all tabs | | <deleteall><br></deleteall> |
| selecttab | Select Tab | | <selecttab id=1><br></selecttab> |
| settab | Set tab | | <settab><br><tab>...</tab><br></settab> |

Events

| Name | Description | Parameters | XML Examples |
|---|---|---|---|
| selchanged | Selection Changed | | <selechanged id=1 text="xyz" data="as111"><br></selechanged> |
| selchanging | Selection Changing | | <selechanging id=1 text="xyz" data="as111"><br></selechanging> |

TABLE 30

Status Bar

Properties

| Name | Description | Structure/Possible Values | XML Examples |
|---|---|---|---|
| pane | Pane | All button attributes | <pane id=0 text="For help press F1"> </pane> |

Methods

| Name | Description | Parameters | XML Examples |
|---|---|---|---|
| addpane | Add Pane | | <addpane><br><pane>...</pane><br></addpane> |
| setpane | Set Pane | | <setpane><pane>...</pane><br></setpane> |

Events

| Name | Description | Parameters | XML Examples |
|---|---|---|---|

TABLE 31

Tool Bar

Properties

| Name | Description | Structure/Possible Values | XML Examples |
|---|---|---|---|
| tool | Tool coulbd be a button or other control | All control Attributes | <tool id=1><br><button>...</button></tool> |

TABLE 31-continued

Tool Bar

| Name | Description | Structure/Possible Values | XML Examples |
|---|---|---|---|
| docked | Which side docked | top,left,bottom,right,float | docked=float |
| moveable | Can be moved | no,canfloat,yes,candock | moveable=canfloat |

Methods

| Name | Description | Parameters | XML Examples |
|---|---|---|---|
| addtool | Add Tool | | <addtool after=1><tool>...</tool></addtool> |
| settool | Set Tool | | <settool><tool>...</tool></settool> |

Events

| Name | Description | Parameters | XML Examples |
|---|---|---|---|
| oncommand | When tool is clicked | | <oncommand id=100></oncommand> |

TABLE 32

Menu

Properties

| Name | Description | Structure/Possible Values | XML Examples |
|---|---|---|---|
| menuitem | Menu Item | See menuitem description | <menuitem>...</menuitem> |
| layout | Layout | vert,horz | layout=vert |

Methods

| Name | Description | Parameters | XML Examples |
|---|---|---|---|
| addmenu | Add Child Menu | | <addchild after=1><menuitem>...</menuitem></addchild> |
| setmenu | Change Properties | | <setmenu><menuitem>...</menuitem></setmenu> |

Events

| Name | Description | Parameters | XML Examples |
|---|---|---|---|
| oncommand | When menu is clicked | | <oncommand id=100></oncommand> |

TABLE 33

Message Dialog

Properties

| Name | Description | Structure/Possible Values | XML Examples |
|---|---|---|---|
| message | Message | | message="Test Message" |
| icon | Icon | | icon="images/image.gif" |
| buttons | Buttons | ok,cancel | buttons=ok/cancel |
| return | Button Presses | ok,cancel | return=ok |

TABLE 33-continued

Message Dialog

Methods

| Name | Description | Parameters | XML Examples |
|---|---|---|---|

Events

| Name | Description | Parameters | XML Examples |
|---|---|---|---|
| close | Dialog closed | | <close return=ok></close> |

TABLE 34

Confirm Dialog

Properties

| Name | Description | Structure/Possible Values | XML Examples |
|---|---|---|---|
| message | Message | | message="Test Message" |
| icon | Icon | | icon="images/image.gif" |
| buttons | Buttons | yes,no,cancel | buttons=ok/cancel |
| return | Button Pressed | yes,no,cancel | return=ok |

Methods

| Name | Description | Parameters | XML Examples |
|---|---|---|---|

Events

| Name | Description | Parameters | XML Examples |
|---|---|---|---|
| close | Dialog closed | | <close return=ok></close> |

TABLE 35

Input Dialog

Properties

| Name | Description | Structure/Possible Values | XML Examples |
|---|---|---|---|
| message | Message | | message="Test Message" |
| icon | Icon | | icon="images/image.gif" |
| buttons | Buttons | ok,cancel | buttons=ok/cancel |
| return | Button Presses | ok,cancel | return=ok |
| datatype | Data Type | string,date,number | datatype=date |

Methods

| Name | Description | Parameters | XML Examples |
|---|---|---|---|

Events

| Name | Description | Parameters | XML Examples |
|---|---|---|---|
| close | Dialog closed | | <close return=ok text="acde"> </close> |

TABLE 36

Color Dialog

Properties

| Name | Description | Structure/Possible Values | XML Examples |
|---|---|---|---|
| color | Color | | color=red |

Methods

| Name | Description | Parameters | XML Examples |
|---|---|---|---|

Events

| Name | Description | Parameters | XML Examples |
|---|---|---|---|
| close | Dialog closed | | <close return=ok color=black> </close> |

TABLE 37

File Dialog

Properties

| Name | Description | Structure/Possible Values | XML Examples |
|---|---|---|---|
| startdir | Starting Directory | | startdir="c:\" |
| filter | File Filter | | filter="*.*" |
| file | Initial File | | file="My File" |
| multifile | Allow Multiple file selection | true,false | multifile=false |
| existfile | Existing Files only | true,false | existfile=true |

Methods

| Name | Description | Parameters | XML Examples |
|---|---|---|---|

Events

| Name | Description | Parameters | XML Examples |
|---|---|---|---|
| close | Dialog closed | | <close return=ok file="abc.gif;gdi.gif"> </close> |

TABLE 38

Printer Dialog

Properties

| Name | Description | Structure/Possible Values | XML Examples |
|---|---|---|---|
| printer | Printer | | printer="HP Laserjet III" |

Methods

| Name | Description | Parameters | XML Examples |
|---|---|---|---|

TABLE 38-continued

Printer Dialog

Events

| Name | Description | Parameters | XML Examples |
|---|---|---|---|
| close | Dialog closed | | <close return=ok printer=" HP Laserjet III"> </close> |

TABLE 39

Validation

Properties

| Name | Description | Structure/Possible Values | XML Examples |
|---|---|---|---|
| validateid | Control to validate | | validateid=10 |
| compareid | Control to Compare | | compareid=15 |
| valtype | Validation type | required, compare, range, expression | valtype=range |
| comparetype | Compare Type | equal,lessthan, greaterthan, notequal | comparetype="equal, lessthan" |
| message | Message when failed | | message="Range validation Failed$$ |
| minvalue | Minimum Value | | minvalue=10 |
| maxvalue | Maximum Value | | maxvalue=40 |
| expression | Expression to check | | expression="[0-9]{3}\s[0-9]{3}–[0-9]{4}" |

Methods

| Name | Description | Parameters | XML Examples |
|---|---|---|---|

Events

| Name | Description | Parameters | XML Examples |
|---|---|---|---|
| close | Dialog closed | | <close return=ok printer=" HP Laserjet III"> </close> |

TABLE 40

Font

Properties

| Name | Description | Structure/Possible Values | XML Examples |
|---|---|---|---|
| size | Size of Font | | size=10 |
| face | Font Face | | face="Time Roman" |
| bold | Bold ? | true,false | bold=true |
| underline | Underline | true,false | underline=true |
| italic | Italic | true,false | italic=false |
| strikethrough | Strikethrough | true,false | strikethrough=false |
| textcolor | Text Color | | textcolor=red |
| backcolor | Background Color | | backcolor=yellow |

TABLE 41

Pen Properties

| Name | Description | Structure/Possible Values | XML Examples |
|---|---|---|---|
| size | Size of pen | | size=10 |
| shape | Shape of pen | square,round | shape=square |
| color | Color | | color=red |
| style | Pen Style | solid,dash,dot, dashdot,dashdotdot | style=dash |
| insideframe | Drawing is inside bounding limits | true,false | insiderframe=true |

TABLE 42

Brush Properties

| Name | Description | Structure/Possible Values | XML Examples |
|---|---|---|---|
| style | Brush Style | solid,bidigonal, cross,diagcross, fdiagonal,horz, vert,image | style=dash |
| color | Color | | color=red |
| image | Pattern Image | | iamge="pattern.gif" |

Structures Used in Components

TABLE 43

Menu Item Properties

| Name | Description | Structure/Possible Values | XML Examples |
|---|---|---|---|
| text | Text | | text="&File" |
| image | Image | | image="images/file.gif" |
| imageloc | image location in reference to text | left,top,right, bottom | imageloc=top |
| imagealign | image alignment | left,right,center, top, bottom,vcenter | imagealign="top,center" |
| popup | Popup menu | true,false | popup=true |
| visible | Visible | true,false | visible=true |
| enabled | Enabled | true,false | enabled=false |
| checked | Checked | true,false | checked=false |
| hint | Menu hint | | hint="Open a File" |
| data | Menu data | | data="abcd" |
| id | Command id | | id=100 |
| hotkey | Hot Key | | hotkey="ctrl+o" |
| align | Alignment | left,top,right, bottom | align=left |

TABLE 44

TableCell Properties

| Name | Description | Structure/Possible Values | XML Examples |
|---|---|---|---|
| row | Row | | row=10 |
| col | Column | | col=10 |
| text | Column text | | text="abcd" |
| image | Column Image | | image="images/ attach.gif" |
| bigimage | Big Image | | bigimage="images/ bigattach.gif" |
| data | Cell Data | | data="celldatar" |

TABLE 45

Table Header Properties

| Name | Description | Structure/Possible Values | XML Examples |
|---|---|---|---|
| col | Column | | col=10 |
| text | Column text | | text="abcd" |
| image | Column Image | | image="images/attach. gif" |
| data | Cell Data | | data="coldatar" |
| width | Cell Width | | width=100 |
| sortedon | Sorted on this column | true,false | sortedon=true |

TABLE 46

Table Row Properties

| Name | Description | Structure/Possible Values | XML Examples |
|---|---|---|---|
| tablerow | Row | | \<tablerow row=10 data="abcd"\> \<tablecell\>...\</tablecell\> \<tablecell\>...\</tablecell\> \</tablerow\> |

9. Layout Manager

The Layout Manager allows adjusting the screens produced by a Java Application. This adjustments may be needed depending on client type. This application has to be developed using JFC and Java. This tool will load screens from application and will allow changing some of their properties. Once the screen has been adjusted it will save a template into a file. The developer could decide the file format. A Java class for loading the file needs to be provided so that applications can use it.

10. Code Analyzer

The Code Analyzer will analyze existing Java applications and pin point the problems running that application under Nexel environment. The programmer can make those changes and recompile the application and deploy it. At this point in time, limitations are not known in great detail. So a rule based engine needs to be developed. This could be a command line tool, which analyzes application source code and finds problems and suggest alternatives, much like a compiler.

11. Nexel Core Classes Initial implementation

An example of an implementation of the Nexel Core Classes is shown in FIG. 13-FIG. 20.

12. Nexel Server Class Diagram

Figure 10:
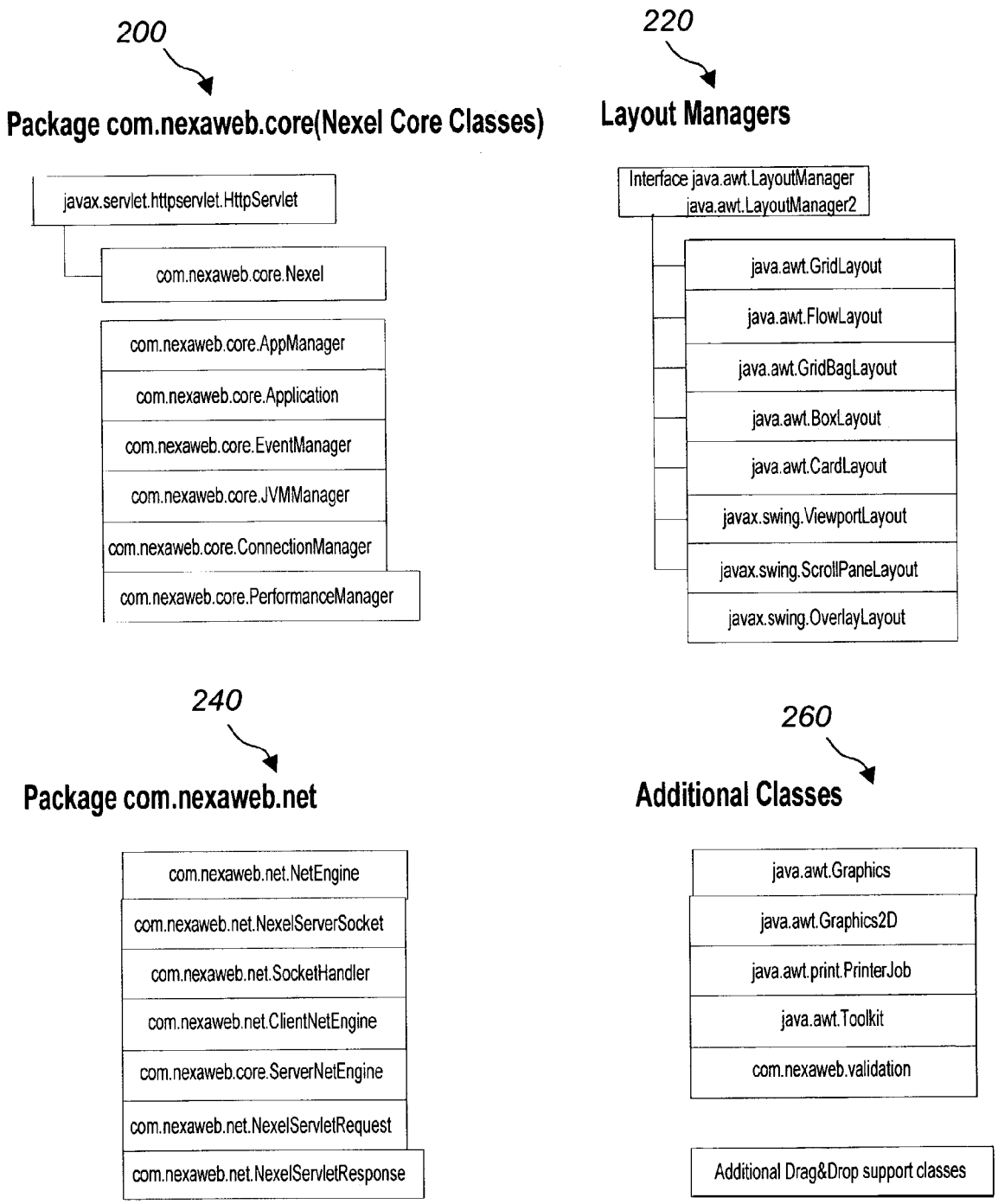
FIG. 10 is a block diagram of the Nexel classes including core classes (package com.nexaweb.core), package com.nexaweb.net, the layout manager and additional classes.
Figure 11:
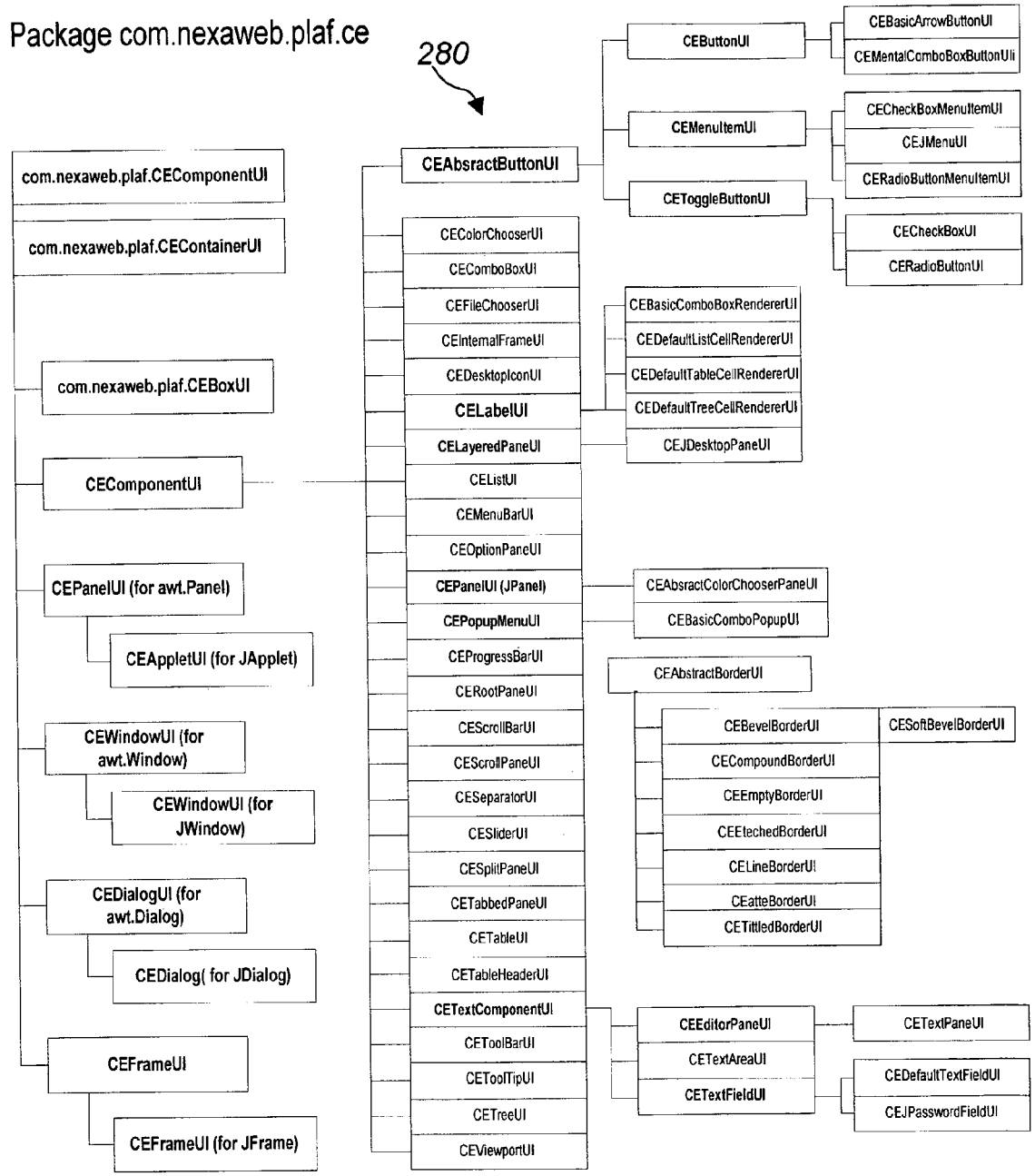
FIG. 11 is a block diagram of the package com.nexaweb.plaf.ce.
Figure 12:
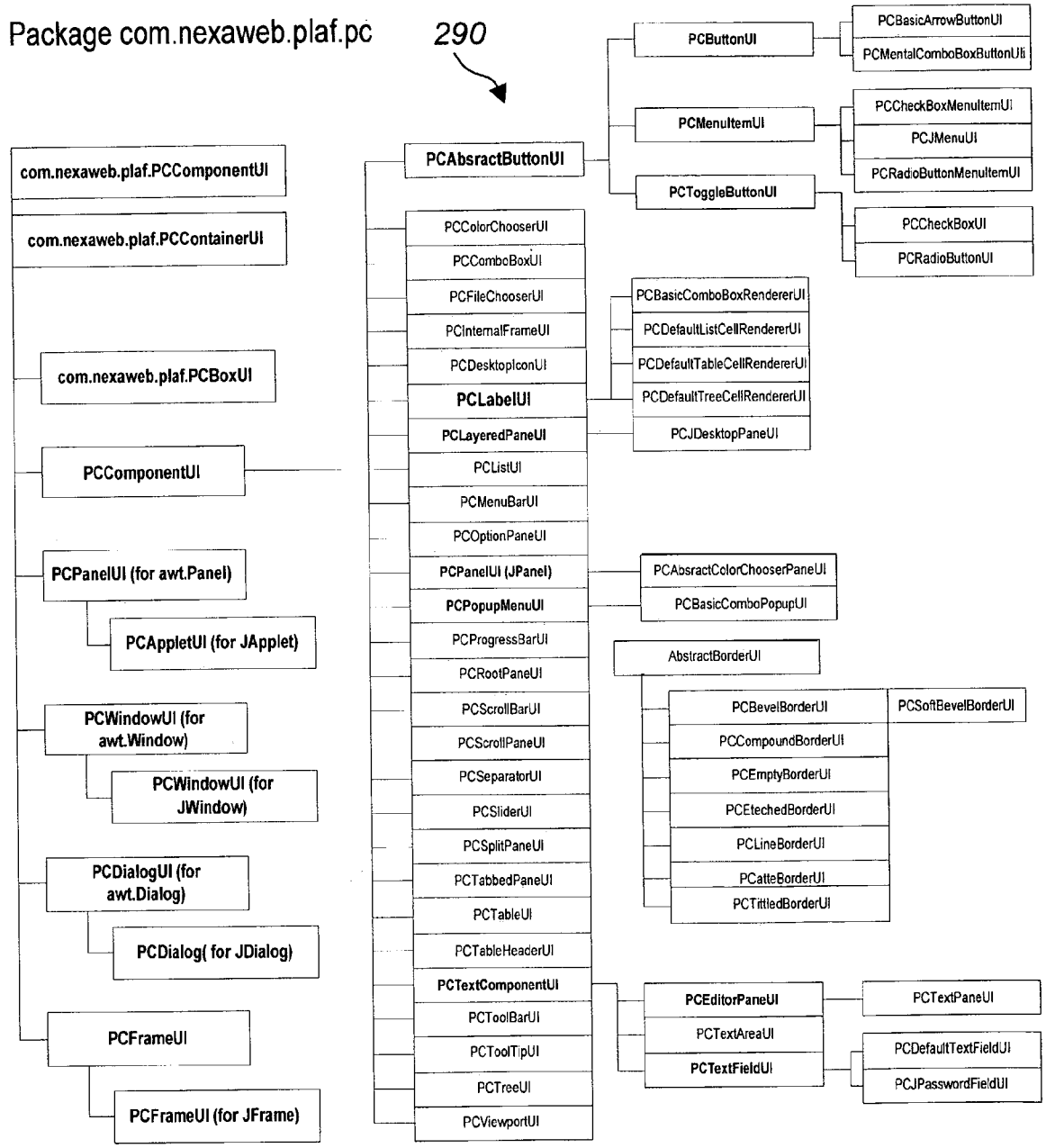
FIG. 12 is a block diagram of the package com.nexaweb.plaf.pc.

Nexel Server Classes include the following packages, shown in FIG. 10, FIG. 11 and FIG. 12:

com.nexaweb.core: core classes for Nexel Server com.nexaweb.net: Nexel Network Engine for communicating with Nexel Client Kernel and other Nexel Servers Selected classes in package java.awt Selected classes in package javax.swing com.nexaweb.plaf.ce: all the UI classes for Windows CE platform com.nexaweb.plaf.pc: all the UI classes for PC (Windows desktop, Unix machine, Macintosh) platforms

What is claimed is:

1. A method for delivering an application over a network from a backend server to a plurality of client devices, at least two of the client devices differing in type and display capabilities, the method comprising the steps of:

receiving a request from a client and determining a type of the client;

having the application invoke a Graphic User Interface (GUI) Application Programming Interface (API) to present the application's user interface;

in response to the type of the client, replacing the GUI API with a re-implemented, network aware GUI API comprising a User Interface (UI) record, the UI record comprising pre-determined format based messages that describe the Graphical User Interface, event processing registries, and other related information corresponding to a presentation layer of the application in high level, object level, messages;

sending such messages to the client device via the network;

processing the messages in the UI record and rendering a user interface by a client-side program operating at the client, which delivers a user experience for that device according to the display capability of the client;

rendering the user interface on the client device;

transmitting a plurality of necessary user input and a plurality of client-side events back to the server via a pre-determined protocol;

processing the user input and client-side events on the backend server, translating the events and inputs as if they were locally generated, and sending such translated events and inputs to the application for processing;

encoding and routing output of the application to the client device using the predetermined messaging format; and, further processing the output by the client-side program to refresh the Graphical User Interface;

wherein use of the re-implemented network aware API enables the application and GUI API to be developed once and deployed multiple times for use by multiple different types of client devices.

2. The method of claim 1, wherein the GUI API and the event processing API are represented as classes within Java Foundation Classes.

3. The method of claim 1, wherein the client-side program is a computer program based on an Operating System's API.

4. The method of claim 1, wherein the client-side program is a wireless device program written using the device's Operating System's API.

5. The method of claim 1, wherein the client-side program is a program written using a Java API.

6. The method of claim 5, wherein the JAVA API is selected from the groups consisting of: Abstract Windows Toolkit (AWT), Personal Java, Java 2 Micro Edition based GUI API or Java Swing.

7. The method of claim 1, wherein the predetermined protocol is Hyper Text Transfer Protocol HTTP.

8. The method of claim 1, wherein the predetermined protocol is Hyper Text Transfer Protocol over Secure Socket Layer (HTTPS).

9. The method of claim 1, wherein predetermined protocol is Wireless Application Protocol (WAP).

10. The method of claim 1, wherein predetermined protocol is proprietary.

11. The method of claim 1, wherein the predetermined messaging format is based on Extended Markup Language (XML).

12. The method of claim 1, wherein the predetermined messaging format is proprietary.

13. The method of claim 1, wherein the network is the Internet.

14. The method of claim 1, wherein the network is a local area network.

15. The method of claim 8, wherein the local area network is a bandwidth-limited slow speed network.

16. The method of claim 1, wherein the network includes a wireless network.

17. The method of claim 11, wherein the client device is selected from the group consisting of workstations, desktops, laptops, Personal Data Assistants (PDAs), and wireless devices.

18. The method of claim 1, wherein the server and the client device are combined into one entity.

19. The method of claim 1 wherein the application code is not modified when distributing the application and the application code is not distributed to the client device.

20. The method of claim 1 used to distribute a plurality of pre-existing applications.

* * * * *